United States Patent
Gordon et al.

(10) Patent No.: US 7,029,620 B2
(45) Date of Patent: *Apr. 18, 2006

(54) ELECTRO-SPINNING PROCESS FOR MAKING STARCH FILAMENTS FOR FLEXIBLE STRUCTURE

(75) Inventors: Gregory Charles Gordon, Cincinnati, OH (US); David William Cabell, Cincinnati, OH (US); Larry Neil Mackey, Fairfield, OH (US); John Gerhard Michael, Cincinnati, OH (US); Paul Dennis Trokhan, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 320 days.

This patent is subject to a terminal disclaimer.

(21) Appl. No.: 10/387,690

(22) Filed: Mar. 13, 2003

(65) Prior Publication Data

US 2003/0201579 A1    Oct. 30, 2003

Related U.S. Application Data

(63) Continuation of application No. PCT/US00/32145, filed on Nov. 27, 2000.

(51) Int. Cl.
- B29C 47/06 (2006.01)
- B32B 5/02 (2006.01)
- B32B 31/30 (2006.01)
- D01D 5/00 (2006.01)
- H05B 7/00 (2006.01)

(52) U.S. Cl. .................. 264/465; 264/171.25; 264/211; 264/510; 264/555

(58) Field of Classification Search ........... 264/171.25, 264/211, 465, 510, 555
See application file for complete search history.

(56) References Cited

U.S. PATENT DOCUMENTS

| | | |
|---|---|---|
| 1,856,401 A | 5/1932 | Prince |
| 1,885,256 A | 11/1932 | Gull |
| 2,570,449 A | 10/1951 | Horsak |
| 2,902,336 A | 9/1959 | Hiemstra et al. |
| 3,117,014 A | 1/1964 | Klug |
| 3,137,592 A | 6/1964 | Protzman et al. |
| 3,280,229 A | 10/1966 | Simons |
| 3,379,811 A | 4/1968 | Hartmann et al. |
| 3,499,074 A | 3/1970 | Barger et al. |
| 3,954,361 A | 5/1976 | Page |
| 4,069,177 A | 1/1978 | Smith |
| 4,076,663 A | 2/1978 | Masuda et al. |
| 4,115,332 A | 9/1978 | Young et al. |
| 4,117,222 A | 9/1978 | Holst et al. |
| 4,139,699 A | 2/1979 | Hernandez et al. |
| 4,243,480 A | 1/1981 | Hernandez et al. |
| 4,340,563 A | 7/1982 | Appel et al. |
| 4,380,570 A | 4/1983 | Schwarz |
| 4,627,811 A | 12/1986 | Greiser et al. |
| 4,673,438 A | 6/1987 | Wittwer et al. |
| 4,818,463 A | 4/1989 | Buehning |
| 4,826,415 A | 5/1989 | Mende |
| 4,853,168 A | 8/1989 | Eden et al. |
| 4,855,179 A | 8/1989 | Bourland et al. |
| 4,900,361 A | 2/1990 | Sachetto et al. |
| 5,079,354 A | 1/1992 | Gross et al. |
| 5,095,054 A | 3/1992 | Lay et al. |
| 5,122,048 A | 6/1992 | Deeds |
| 5,234,977 A | 8/1993 | Bastioli et al. |
| 5,275,774 A | 1/1994 | Bahr et al. |
| 5,277,761 A | 1/1994 | Van Phan et al. |
| 5,280,055 A | 1/1994 | Tomka |
| 5,286,770 A | 2/1994 | Bastioli et al. |
| 5,288,765 A | 2/1994 | Bastioli et al. |
| 5,314,934 A | 5/1994 | Tomka |
| 5,316,578 A | 5/1994 | Buehler et al. |
| 5,346,936 A | 9/1994 | Buehler et al. |
| 5,362,777 A | 11/1994 | Tomka |
| 5,368,690 A | 11/1994 | Solarek et al. |
| 5,382,611 A | 1/1995 | Stepto et al. |
| 5,405,564 A | 4/1995 | Stepto et al. |
| 5,420,180 A | 5/1995 | Katayama et al. |
| 5,425,987 A | 6/1995 | Shawver et al. |
| 5,427,614 A | 6/1995 | Wittwer et al. |
| 5,444,113 A | 8/1995 | Sinclair et al. |

(Continued)

FOREIGN PATENT DOCUMENTS

EP    0 080 382    6/1983

(Continued)

OTHER PUBLICATIONS

A.J.F. de Carvalho, A.A.S. Curvelo, J.A.M. Agnelli, A First Insight on Composites of Thermoplastic Starch and Kaolin, Carbohydrate Polymers 45 (2001) 189-194, received Sep. 23, 1999; revised Jan. 26, 2000, 2001 Elsevier Science Ltd.

(Continued)

Primary Examiner—Leo B. Tentoni
(74) Attorney, Agent, or Firm—C. Brant Cook; Vladimir Vitenberg; David M. Weirich

(57) ABSTRACT

A flexible structure includes a plurality of starch filaments. The structure includes at least a first region and a second region, each of the first and second regions having at least one common intensive property selected from the group consisting of density, basis weight, elevation, opacity, crepe frequency, and any combination thereof. The common intensive property of the first region differs in value from the common intensive property of the second region.

23 Claims, 9 Drawing Sheets

U.S. PATENT DOCUMENTS

| | | | |
|---|---|---|---|
| 5,446,140 A | 8/1995 | Maheras et al. |
| 5,462,982 A | 10/1995 | Bastioli et al. |
| 5,476,616 A | 12/1995 | Schwarz |
| 5,480,923 A | 1/1996 | Schmid et al. |
| 5,516,815 A | 5/1996 | Buehler et al. |
| 5,679,145 A | 10/1997 | Andersen et al. |
| 5,693,279 A | 12/1997 | Feuer et al. |
| 5,703,160 A | 12/1997 | Dehennau et al. |
| 5,705,536 A | 1/1998 | Tomka |
| 5,720,832 A | 2/1998 | Minto et al. |
| 5,736,586 A | 4/1998 | Bastioli et al. |
| 5,773,495 A | 6/1998 | Haschke et al. |
| 5,844,023 A | 12/1998 | Tomka |
| 5,866,251 A | 2/1999 | Bastioli et al. |
| 5,874,486 A | 2/1999 | Bastioli et al. |
| 5,945,480 A | 8/1999 | Wang et al. |
| 6,013,223 A | 1/2000 | Schwarz |
| 6,045,908 A | 4/2000 | Nakajima et al. |
| 6,096,809 A | 8/2000 | Lorcks et al. |
| 6,117,925 A | 9/2000 | Tomka |
| 6,214,907 B1 | 4/2001 | Tomka |
| 6,218,321 B1 | 4/2001 | Lorcks et al. |
| 6,231,970 B1 | 5/2001 | Andersen et al. |
| 6,235,815 B1 | 5/2001 | Loercks et al. |
| 6,235,816 B1 | 5/2001 | Lorcks et al. |
| 6,235,835 B1 | 5/2001 | Niessner et al. |
| 6,238,520 B1 | 5/2001 | Greenwood |
| 6,242,102 B1 | 6/2001 | Tomka |
| 6,277,899 B1 | 8/2001 | Bastioli et al. |
| 6,302,997 B1 | 10/2001 | Hurter et al. |
| 6,303,000 B1 | 10/2001 | Floyd et al. |
| 6,365,002 B1 | 4/2002 | Bindzus et al. |
| 6,365,079 B1 | 4/2002 | Winkler et al. |
| 6,372,361 B1 | 4/2002 | Mackewicz et al. |
| 6,472,497 B1 | 10/2002 | Loercks et al. |
| 6,506,824 B1 | 1/2003 | Bastioli et al. |
| 6,517,678 B1 | 2/2003 | Shannon et al. |
| 2002/0015854 A1 | 2/2002 | Billmers et al. |
| 2002/0170693 A1 | 11/2002 | Merrette et al. |
| 2003/0022581 A1 | 1/2003 | Tsai et al. |
| 2003/0072731 A1 | 4/2003 | Gulian et al. |
| 2003/0099692 A1 | 5/2003 | Lydzinski et al. |

FOREIGN PATENT DOCUMENTS

| | | | |
|---|---|---|---|
| EP | 0 108 364 B1 | 8/1986 |
| EP | 0 232 121 A2 | 8/1987 |
| EP | 0 327 505 B2 | 8/1989 |
| EP | 0 522 358 A2 | 1/1993 |
| EP | 0 541 050 A2 | 5/1993 |
| EP | 0 722 980 B1 | 7/1996 |
| EP | 1 035 163 A2 | 9/2000 |
| EP | 1 035 239 A2 | 9/2000 |
| EP | 0 103 655 A1 | 5/2001 |
| GB | 1 247 474 | 9/1971 |
| JP | 61040341 A | 2/1986 |
| JP | 62028410 A | 2/1987 |
| JP | 4100913 A | 4/1992 |
| JP | 4146217 A | 5/1992 |
| JP | 6212594 A | 8/1994 |
| JP | 06-269239 A | 9/1994 |
| JP | 8027627 A | 1/1996 |
| JP | 8260250 A | 10/1996 |
| JP | 09-041224 A | 2/1997 |
| JP | 9276331 A | 10/1997 |
| JP | 10008364 A | 1/1998 |
| WO | WO 93/00475 A1 | 1/1993 |
| WO | WO 98/40434 A1 | 9/1998 |
| WO | WO 00/43423 A1 | 7/2000 |
| WO | WO 01/38635 A1 | 5/2001 |
| WO | WO 01/49912 A1 | 7/2001 |

OTHER PUBLICATIONS

W. John G. McCulloch, Ph.D., The History of the Development of Melt Blowing Technology, Inj Spring 1999, pp. 66-72.

Author Unknown, A New Crop of Nonwovens, Nonwovens Industry, Feb. 2000, p. 58.

Susan Warren, Cargill, Dow Chemical to Make 'Natural Plastic', Wall Street Journal, Jan. 11, 2000.

Susanna Schiemer, Biodegradable Cellulose Fiber, Nonwovens World, Oct.-Nov. 1999, pp. 71-74.

H. Dale Wilson, Novel Polypropylene Resins for Nonwovens, Nonwovens World Oct.-Nov. 1999, p. 76.

Jan H. Schut, The New Look in Plastic—It's Paper!, Plastics Technology, Feb. 2000, pp. 52-57.

Josef L. Kokin, Lih-Shiuh Lai, Lisa L. Chedid, Effect of Starch Structure on Starch Rheological Properties, Food Technology, Jun. 1992, pp. 130-138.

Ralph D. Waniska and Marta H. Gomez, Dispersion Behavior of Starch, source unknown. undated.

D.H. Muller, A. Krobjilowski, Meltblown Fabrics from Biodegradable Polymers, International Nonwovens Journal (Mar. 2001); abstract only.

S. Simmons et al., Thermoplastic Processing of Starch: .Melt-Spinning of Starch-Based Fibers, Biodegradable Polymer Packaging (1993), Conference Proceedings, Publisher: Technomic, Lancaster, PA, pp. 171-207.

ELECTRO-SPINNING PROCESS FOR MAKING STARCH FILAMENTS FOR FLEXIBLE STRUCTURE

CROSS REFERENCE TO RELATED APPLICATIONS

This is a continuation of International Application PCT/US00/32145, with an international filing date of Nov. 27, 2000.

FIELD OF THE INVENTION

The present invention relates to flexible structures comprising starch filaments, and more specifically, to flexible structures having differential regions.

BACKGROUND OF THE INVENTION

Cellulosic fibrous webs such as paper are well known in the art. Low density fibrous webs are in common use today for paper towels, toilet tissue, facial tissue, napkins, wet wipes, and the like. The large demand for such paper products has created a demand for improved versions of the products and the methods of their manufacture. In order to meet such demands, papermaking manufacturers must balance the costs of machinery and resources with the total cost of delivering the products to the consumer.

For conventional papermaking operations, wood cellulosic fibers are re-pulped, beaten or refined to achieve a level of fiber hydration in order to form an aqueous pulp slurry. Processes for the making of paper products for use in tissue, toweling, and sanitary products generally involve the preparation of the aqueous slurry and then subsequently removing the water from the slurry while contemporaneously rearranging the fibers therein to form a paper web. Subsequent to dewatering, the web is processed into a dry roll or sheet form and eventually converted into a consumer package. Various types of machinery must be employed to assist in the dewatering process and converting operations requiring a significant investment in capital.

Another aspect of the conventional papermaking operation involves the incorporation of additives into the pulp in order to achieve specific end properties. For instance, additives such as strength resins, debonding surfactants, softening agents, pigments, lattices, synthetic micro-spheres, fire-retardants, dyes, perfumes, etc., are often employed in the manufacture of paper. The efficient retention of these additives at the wet end of a papermaking process presents difficulty to the manufacturer since that portion which is not retained creates not only an economic loss but also significant pollution problems if it becomes part of a plant effluent. Additives can also be added to the paper web subsequent to dewatering via coating or saturation processes commonly known in the art. These processes usually require that excess heating energy be consumed to re-dry the paper after coating. Moreover, in some instances, the coating systems are required to be solvent based which increases capital costs and requires recovery of volatile materials to meet regulatory requirements.

Various natural fibers other than cellulose as well as a variety of synthetic fibers have been employed in making paper, however, all these replacements have failed to provide a commercially acceptable substitute for cellulose due to their high cost, poor bonding properties, chemical incompatibilities, and handling difficulties in manufacturing systems. Starch filaments have been suggested as a substitute for cellulose in various aspects of the papermaking process, however, commercial attempts to use such starch filaments have been unsuccessful. As a result, paper products are still being manufactured almost exclusively from wood-based cellulosic ingredients.

Accordingly, the present invention provides a flexible structure comprising long starch filaments and a process for making same. Particularly, the present invention provides a flexible structure comprising a plurality of starch filaments, wherein the structure comprises two or more regions having distinct intensive properties for improved strength, absorbency, and softness.

The present invention also provides methods of making starch filaments. Particularly, the present invention provides an electro-spinning process of producing a plurality of starch filaments.

SUMMARY OF THE INVENTION

A flexible structure comprises a plurality of starch filaments. At least some of the plurality of starch filaments have a size from about 0.001 dtex to 135 dtex, and more specifically from 0,01 dtex to 5 dtex. An aspect ratio of a length of a major axis of at least some starch filaments to an equivalent diameter of a cross-section perpendicular to the major axis of the starch filaments is greater than 100/1, more specifically greater than 500/1, and still more specifically greater than 1000/1, and even more specifically, greater than 5000/1.

The structure comprises at least a first region and a second region, each of the first and second regions having at least one common intensive property selected from the group consisting of density, basis weight, elevation, opacity, crepe frequency, and any combination thereof. At least one common intensive property of the first region differs in value from the at least one common intensive property of the second region.

In one embodiment, one of the first and second regions comprises a substantially continuous network, and the other of the first and second regions comprises a plurality of discrete areas dispersed throughout the substantially continuous network. In another embodiment, at least one of the first region and the second region comprises a semi-continuous network.

The flexible structure can further comprise at least a third region having at least one intensive property that is common with and differs in value from the intensive property of the first region and the intensive property of the second region. In one embodiment, at least one of the first, second, and third regions can comprise a substantially continuous network. In another embodiment, at least one of the first, second, and third regions can comprise discrete, or discontinuous, areas. In still another embodiment, at least one of the first, second, and third regions can comprise substantially semi-continuous areas. In yet another embodiment, at least one of the first, second, and third regions can comprise a plurality of discrete areas dispersed throughout the substantially continuous network.

In the embodiment wherein the flexible structure comprises a substantially continuous network region and a plurality of discrete areas dispersed throughout the substantially continuous network region, the substantially continuous network region can have a relatively high density relative to a relatively low density of the plurality of discrete areas. When the structure is disposed on a horizontal reference plane, the first region defines a first elevation, and the second region outwardly extends from the first region to define a second elevation greater (relative to the horizontal reference plane) than the first elevation.

In the embodiment comprising at least three regions, the first region can define a first elevation, the second region can define a second elevation, and the third region can define a third elevation when the structure is disposed on a horizontal reference plane. At least one of the first, second, and third elevations can be different from at least one of the other elevations, for example, the second elevation can be intermediate the first elevation and the third elevation.

In one embodiment, the second region comprises a plurality of starch pillows, wherein an individual pillow can comprise a dome portion extending from the first elevation to the second elevation and a cantilever portion laterally extending from the dome portion at the second elevation. A density of the starch cantilever portion can be equal to or different from at least one of a density of the first region and a density of the dome portion, or be intermediate the density of the first region and the density of the dome portion. The cantilever portions are typically elevated from the first plane to form substantially void spaces between the first region and the cantilever portions.

The flexible structure can be made by producing the plurality of starch filaments by melt-spinning, dry-spinning, wet-spinning, electro-spinning or any combination thereof; providing a molding member having a three-dimensional filament-receiving side structured to receive the plurality of starch filaments thereon, depositing the plurality of starch filaments to the filament-receiving side of the molding member, wherein the plurality of starch filaments at least partially conform to the pattern thereof; and separating the plurality of the starch filaments from the molding member.

The step of depositing the plurality of starch filaments to the filament-receiving side of the molding member may include causing the plurality of starch filaments to at least partially conform to the three-dimensional pattern of the molding member. That can be accomplished by for example, applying a fluid pressure differential to the plurality of starch filaments.

In one embodiment, the step of depositing the plurality of starch filaments to the molding member comprises depositing the starch filaments at an acute angle relative to the filament-receiving side of the molding member, wherein the acute angle is from about 5 degrees to about 85 degrees.

The molding member comprises, in one embodiment, a resinous framework joined to a reinforcing element. The molding member can be fluid-permeable, fluid-impermeable, or partially fluid-permeable. The reinforcing element can be positioned between the filament-receiving side and at least a portion of the backside of the framework. The filament-receiving side can comprise a substantially continuous pattern, a substantially semi-continuous pattern, a discontinuous pattern, or any combination thereon. The framework can comprise a plurality of apertures therethrough that can be continuous, discrete, or semi-continuous, analogously and conversely to the pattern of the framework.

In one embodiment, the molding member is formed by a reinforcing element disposed at a first elevation, and a resinous framework joined to the reinforcing element in a face-to-face relationship and outwardly extending from the reinforcing element to form a second elevation. The molding member can comprise a plurality of interwoven yarns, a felt, or any combination thereof.

When the plurality of the starch filaments is deposited to the filament-receiving side of the molding member, they tend, due to their flexibility and/or as a result of application of fluid pressure differential, to at least partially conform to the three-dimensional pattern of the molding member, thereby forming the first regions of the plurality of starch filaments supported by the patterned framework, and the second regions of the plurality of starch filaments deflected into the aperture or apertures thereof and supported by the reinforcing element.

In one embodiment, the molding member comprises suspended portions. The resinous framework of such a molding member comprises a plurality of bases outwardly extending from the reinforcing element and a plurality of cantilever portions laterally extending from the bases at the second elevation to form void spaces between the cantilever portions and the reinforcing element, wherein the plurality of bases and the plurality of cantilever portions form, in combination, the three-dimensional filament-receiving side of the molding member. Such a molding member can be formed by at least two layers joined together in a face-to-face relationship such that portions of the framework of one of the layers correspond to apertures in the other layer. The molding member comprising suspended portions can also be formed by differential curing of the photosensitive resinous layer through a mask having a pattern comprising areas of differential opacity.

The process of making the flexible structure of the present invention may further comprise a step of densifying selected portions of the plurality of starch filaments, for example, by applying a mechanical pressure to the plurality of starch filaments.

The process may further include a step of foreshortening the plurality of starch filaments. The foreshortening may be accomplished by creping, microcontraction, or a combination thereof.

An electro-spinning process for making starch filaments comprises steps of providing a starch composition having an extensional viscosity from about 50 pascal·second to about 20,000 pascal·second; and electro-spinning the starch composition, thereby producing starch filaments having a size from about 0.001 dtex to about 135 dtex. The step of electro-spinning the starch composition typically comprises electro-spinning the starch composition through a die.

The starch in the starch composition has a weight-average molecular weight from about 1,000 to about 2,000,000; and the starch composition has a capillary number of at least 0.05, and more specifically at least 1.00. In one embodiment, the starch composition comprises from about 20% to about 99% by weight is amylopectin. The starch in the starch composition may have a weight-average molecular weight from about 1,000 to about 2,000,000. The starch composition may comprise a high polymer having a weight-average molecular weight of at least 500,000.

The starch composition may comprise from about 10% to about 80% by weight of the starch and from about 20% to about 90% by weight of additives. Such a starch composition may have an extensional viscosity from about 100 Pascal·seconds to about 15,000 Pascal·seconds at a temperature from about 20° C. to about 180° C.

The starch composition may comprise from about 20% to about 70% by weight of the starch and from about 30% to about 80% by weight of additives. Such a starch composition may have the extensional viscosity from about 200 Pascal·seconds to about 10,000 Pascal·seconds at a temperature from about 20° C. to about 100° C.

The starch composition have the extensional viscosity from about 200 Pascal·seconds to about 10,000 Pascal·seconds may have a capillary number from about 3 to about 50. More specifically, the starch composition having the extensional viscosity from about 300 pascal·seconds to about 5,000 pascal·seconds may have a capillary number from about 5 to about 30.

In one embodiment, the starch composition comprises from about 0.0005% to about 5% by weight of a high polymer substantially compatible with the starch and having an average molecular weight of at least 500,000.

The starch composition can comprise an additive selected from the group consisting of plasticizers and diluents. Such a starch composition may further comprise from about 5% to about 95% by weight of a protein, wherein the protein comprises a corn-derived protein, a soybean-derived protein, a wheat derived protein, or any combination thereof.

The process for making the starch filaments may further comprise a step of attenuating the starch filaments with streams of air.

In one embodiment, a process for making a flexible structure comprising starch filaments includes steps of providing a starch composition having an extensional viscosity from about 100 pascal·second to about 10,000 pascal·second; providing a molding member having a three-dimensional filament-receiving side and a backside opposite thereto, the filament-receiving side comprising a substantially continuous pattern, a substantially semi-continuous pattern, a discrete pattern, or any combination thereof; electro-spinning the starch composition, thereby producing a plurality of starch filaments; and depositing the plurality of starch filaments to the filament-receiving side of the molding member, wherein the starch filaments conform to the three-dimensional pattern of the filament-receiving side.

In an industrial process, the molding member continuously travels in a machine direction.

DETAILED DESCRIPTION OF THE INVENTION

Figure 1:
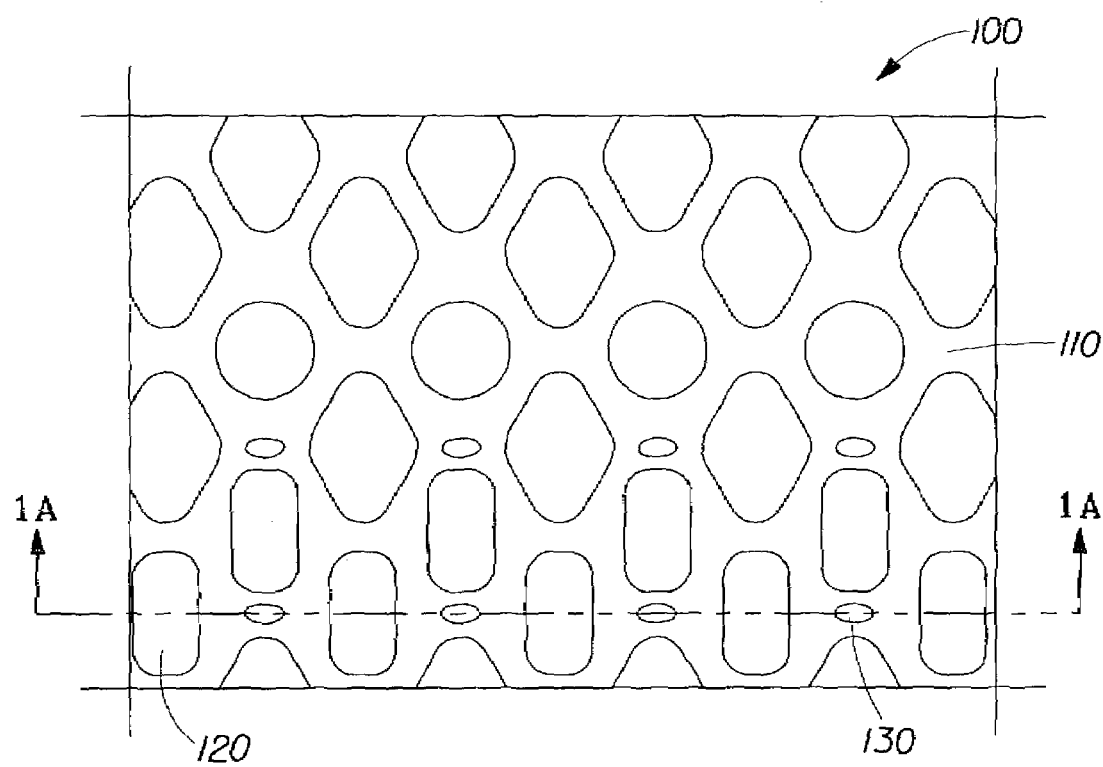
FIG. 1 is a schematic plan view of an embodiment of the flexible structure of the present invention.

As used herein, the following terms have the following meanings.

"Flexible structure comprising starch filaments," or simply "flexible structure," is an arrangement comprising a plurality of starch filaments that are mechanically inter-entangled to form a sheet-like product having certain predetermined microscopic geometric, physical, and aesthetic properties.

"Starch filament" is a slender, thin, and highly flexible object comprising starch and having a major axis which is very long, compared to the fiber's two mutually-orthogonal axes that are perpendicular to the major axis. An aspect ratio of the major's axis length to an equivalent diameter of the filament's cross-section perpendicular to the major axis is greater than 100/1, more specifically greater than 500/1, and still more specifically greater than 1000/1, and even more specifically, greater than 5000/1. The starch filaments may comprise other matter, such as, for example water, plasticizers, and other optional additives.

"Equivalent diameter" is used herein to define a cross-sectional area and a surface area of an individual starch filament, without regard to the shape of the cross-sectional area. The equivalent diameter is a parameter that satisfies the equation $S=\frac{1}{4}\pi D^2$, where S is the starch filament's cross-sectional area (without regard to its geometrical shape), $\pi=3.14159$, and D is the equivalent diameter. For example, the cross-section having a rectangular shape formed by two mutually opposite sides "A" and two mutually opposite sides "B" can be expressed as: $S=A\times B$. At the same time, this cross-sectional area can be expressed as a circular area having the equivalent diameter D. Then, the equivalent diameter D can be calculated from the formula: $S=\frac{1}{4}\pi D^2$, where S is the known area of the rectangle. (Of course, the equivalent diameter of a circle is the circle's real diameter.) An equivalent radius is ½ of the equivalent diameter.

"Pseudo-thermoplastic" in conjunction with "materials" or "compositions" is intended to denote materials and compositions that by the influence of elevated temperatures, dissolution in an appropriate solvent, or otherwise can be softened to such a degree that they can be brought into a flowable state, in which condition they can be shaped as desired, and more specifically, processed to form starch filaments suitable for forming a flexible structure. Pseudo-thermoplastic materials may be formed, for example, under combined influence of heat and pressure. Pseudo-thermoplastic materials differ from thermoplastic materials in that the softening or liquefying of the pseudo-thermoplastics is caused by softeners or solvents present, without which it would be impossible to bring them by any temperature or pressure into a soft or flowable condition necessary for shaping, since pseudo thermoplastics do not "melt" as such.

The influence of water content on the glass transition temperature and melting temperature of starch can be measured by differential scanning calorimetery as described by Zeleznak and Hoseny in "Cereal Chemistry", Vol. 64, No. 2, pp. 121–124, 1987. Pseudo-thermoplastic melt is a pseudo-thermoplastic material in a flowable state.

"Micro-geometry" and permutations thereof refers to relatively small (i. e., "microscopical") details of the flexible structure, such as, for example, surface texture, without regard to the structure's overall configuration, as opposed to its overall (i. e., "macroscopical") geometry. Terms containing "macroscopical" or "macroscopically" refer to an overall geometry of a structure, or a portion thereof, under consideration when it is placed in a two-dimensional configuration, such as the X-Y plane. For example, on a macroscopical level, the flexible structure, when it is disposed on a flat surface, comprises a relatively thin and flat sheet. On a microscopical level, however, the structure can comprise a plurality of first regions that form a first plane having a first elevation, and a plurality of domes or "pillows" dispersed throughout and outwardly extending from the framework region to form a second elevation.

"Intensive properties" are properties which do not have a value dependent upon an aggregation of values within the plane of the flexible structure. A common intensive property is an intensive property possessed by more than one region. Such intensive properties of the flexible structure of the present invention include, without limitation, density, basis weight, elevation, opacity, and crepe frequency (if the structure is to be foreshortened). For example, if a density is a common intensive property of two differential regions, a value of the density in one region can differ from a value of the density in the other region. Regions (such as, for example, a first region and a second region) are identifiable areas distinguishable from one another by distinct intensive properties.

"Basis weight" is the weight (measured in grams force) of a unit area of the starch flexible structure, which unit area is taken in the plane of the starch filament structure. The size and shape of the unit area from which the basis weight is measured is dependent upon the relative and absolute sizes and shapes of the regions having differential basis weights.

"Density" is the ratio of the basis weight to a thickness (taken normal to the plane of the flexible structure) of a region. Apparent density is the basis weight of the sample divided by the caliper with appropriate unit conversions incorporated therein. Apparent density used herein has the units of grams/centimeters cubed ($g/cm^3$).

"Caliper" is a macroscopic thickness of a sample measured as described below. Caliper should be distinguished from the elevation of differential regions, which is microscopical characteristic of the regions.

"Glass transition temperature," $T_g$, is the temperature at which the material changes from a viscous or rubbery condition to a hard and relatively brittle condition.

"Machine direction" (or MD) is the direction parallel to the flow of the flexible structure being made through the manufacturing equipment. "Cross-machine direction" (or CD) is the direction perpendicular to the machine direction and parallel to the general plane of the flexible structure being made.

"X," "Y," and "Z" designate a conventional system of Cartesian coordinates, wherein mutually perpendicular coordinates "X" and "Y" define a reference X-Y plane, and "Z" defines an orthogonal to the X-Y plane. "Z-direction" designates any direction perpendicular to the X-Y plane. Analogously, the term "Z-dimension" means a dimension, distance, or parameter measured parallel to the Z-direction. When an element, such as, for example, a molding member curves or otherwise deplanes, the X-Y plane follows the configuration of the element.

"Substantially continuous" region (area/network/framework) refers to an area within which one can connect any two points by an uninterrupted line running entirely within that area throughout the line's length. That is, the substantially continuous region has a substantial "continuity" in all directions parallel to the first plane and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the flexible structure (or a molding member) as designed and intended.

"Substantially semi-continuous" region (area/network/framework) refers an area which has "continuity" in all, but at least one, directions parallel to the first plane, and in which area one cannot connect any two points by an uninterrupted line running entirely within that area throughout the line's length. The semi-continuous framework may have continuity only in one direction parallel to the first plane. By analogy with the continuous region, described above, while an absolute continuity in all, but at least one, directions is preferred, minor deviations from such a continuity may be tolerable as long as those deviations do not appreciably affect the performance of the structure (or the deflection member).

"Discontinuous" regions refer to discrete, and separated from one another areas that are discontinuous in all directions parallel to the first plane.

"Absorbency" is the ability of a material to take up fluids by various means including capillary, osmotic, solvent, or chemical action and retain such fluids. Absorbency can be measured according to the test described herein.

"Flexibility" is the ability of a material or structure to deform under a given load without being broken, regardless of the ability or inability of the material or structure to return itself to its pre-deformation shape.

"Molding member" is a structural element that can be used as a support for the starch filaments that can be deposited thereon during a process of making the flexible structure of the present invention, and as a forming unit to form (or "mold") a desired microscopical geometry of the flexible structure of the present invention. The molding member may comprise any element that has the ability to impart a three-dimensional pattern to the structure being produced thereon, and includes, without limitation, a stationary plate, a belt, a woven fabric, and a band.

"Reinforcing element" is a desirable, but not necessary, element in some embodiments of the molding member, serving primarily to provide or facilitate integrity, stability, and durability of the molding member comprising, for example, a resinous material. The reinforcing element can be fluid-permeable, fluid-impermeable, or partially fluid-permeable, and may comprise a plurality of interwoven yarns, a felt, a plastic, other suitable synthetic material, or any combination thereof.

"Press-surface" is a surface that can be pressed against the fillament-receiving side of the molding member having a plurality of starch filaments thereon, to deflect, at least partially, the starch filaments into the molding member having a three-dimensional pattern of depressions/protrusions therein.

"Decitex," or "dtex," is a unit of measure for a starch filament expressed in grams per 10,000 meters, $$\frac{\text{grams}}{10,000\ \text{meters}}.$$

"Melt-spinning" is a process by which a thermoplastic or pseudo-thermoplastic material is turned into fibrous material through the use of an attenuation force. Melt-spinning can include mechanical elongation, melt-blowing, spun-bonding, and electro-spinning.

"Mechanical elongation" is the process inducing a force on a fiber thread by having it come into contact which a driven surface, such as a roll, to apply a force to the melt thereby making fibers.

"Melt-blowing" is a process for producing fibrous webs or articles directly from polymers or resins using high-velocity air or another appropriate force to attenuate the filaments. In a melt-blowing process the attenuation force is applied in the form of high speed air as the material exits the die or spinnerette.

"Spun-bonding" comprises the process of allowing the fiber to drop a predetermined distance under the forces of flow and gravity and then applying a force via high velocity air or another appropriate source.

"Electro-spinning" is a process that uses electric potential as the force to attenuate the fibers.

"Dry-spinning," also commonly known as "solution-spinning," involves the use of solvent drying to stabilize fiber formation. A material is dissolved in an appropriate solvent and is attenuated via mechanical elongation, melt-blowing, spun-bonding, and/or electro-spinning. The fiber becomes stable as the solvent is evaporated.

"Wet-spinning" comprises dissolving a material in a suitable solvent and forming small fibers via mechanical elongation, melt-blowing, spun-bonding, and/or electro-spinning. As the fiber is formed it is run into a coagulation system normally comprising a bath filled with an appropriate solution that solidifies the desired material, thereby producing stable fibers.

High Polymer "substantially compatible with starch" means that the high polymer is capable of forming a substantially homogeneous mixture composition with the starch (i.e., the composition that appears transparent or translucent to the naked eye) when the composition is heated to a temperature above the softening and/or its melting temperature.

"Melting temperature" means the temperature or the range of temperature at or above which the starch composition melts or softens sufficiently to be capable of being processed into starch filaments in accordance with the present invention. It is to be understood that some starch compositions are pseudo-thermoplastic compositions and as such may not exhibit pure "melting" behavior.

"Processing temperature" means the temperature of the starch composition, at which temperature the starch filaments of the present invention can be formed, for example, by attenuation.

Flexible Structure

Figure 2:
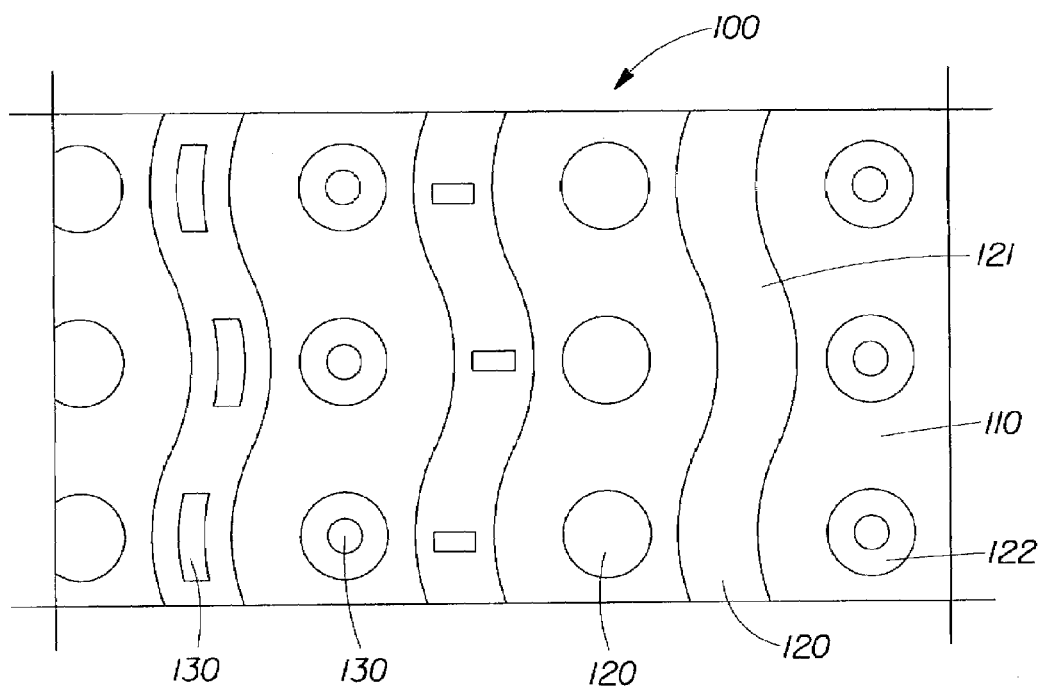
FIG. 2 is a schematic plan view of another embodiment of the flexible structure of the present invention.
Figure 3:
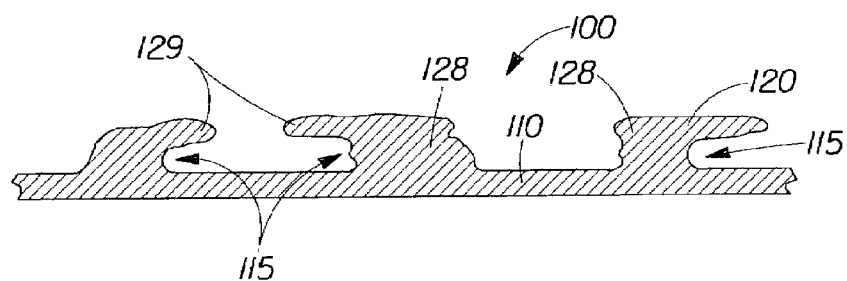
FIG. 3 is a schematic cross-sectional view of another embodiment of the flexible structure of the present invention.

Referring to FIGS. 1–3, a flexible structure 100 comprising pseudo-thermoplastic starch filaments comprises at least a first region 110 and a second region 120. Each of the first and second regions has at least one common intensive property, such as, for example, a basis weight or density. The common intensive property of the first region 110 differs in value from the common intensive property of the second region 120. For example, the density of the first region 110 can be higher than the density of the second region 120.

The first and second regions 110 and 120 of the flexible structure 100 of the present invention can also differentiate in their respective micro-geometry. In FIG. 1, for example, the first region 110 comprises a substantially continuous network forming a first plane at a first elevation when the structure 100 is disposed on a flat surface; and the second region 120 can comprise a plurality of discrete areas dispersed throughout the substantially continuous network. These discrete areas may, in some embodiments, comprise discrete protuberances, or "pillows," outwardly extending from the network region to form a second elevation greater than the first elevation, relative to the first plane. It is to be understood that pillows can also comprise a substantially continuous pattern and a substantially semi-continuous pattern.

In one embodiment, the substantially continuous network region can have a relatively high density, and the pillows have a relatively low density. In another embodiment, the substantially continuous network region can have a relatively low basis weight, and the pillows have a relatively high basis weight. In still other embodiments, the substantially continuous network region can have a relatively low density, and the pillows can have a relatively high density. An embodiment is contemplated, in which the substantially continuous network region can have a relatively high basis weight, and the pillows have a relatively low basis weight.

In other embodiments, the second region 120 can comprise a semi-continuous network. In FIG. 2, the second region 120 comprises discrete areas 122, similar to those shown in FIG. 1; and semi-continuous areas 121, extending in at least one direction as seen in the X-Y plane (i.e., a plane formed by the first region 110 of the structure 100 disposed on a flat surface).

In the embodiments shown in FIGS. 1 and 2, the flexible structure 100 comprises a third region 130 having at least one intensive property that is common with and differs in value from the intensive property of the first region 110 and the intensive property of the second region 120. For example, the first region 110 can have the common intensive property having a first value, the second region 120 can have the common intensive property having a second value, and the third region 130 can have the common intensive property having a third value, wherein the first value can be different from the second value, and the third value can be different from the second value and the first value.

When the structure 100 comprising at least three differential regions 110, 120, 130, as described herein above, is disposed on a horizontal reference plane (e.g., the X-Y plane), the first region 110 defines the plane having the first elevation, and the second region 120 extends therefrom to define the second elevation. An embodiment is contemplated, in which the third region 130 defines a third elevation, wherein at least one of the first, second, and third elevations is different from at least one of the other elevations. For example, the third elevation can be intermediate the first and second elevations.

The following table shows, without limitation, some possible combinations of embodiments of the structure 100 comprising at least three regions having differential (i.e., high, medium, or low) intensive properties. All of these embodiments are included in the scope of the present invention.

| INTENSIVE PROPERTIES | | |
| --- | --- | --- |
| HIGH | MEDIUM | LOW |
| Continuous | Discontinuous | Discontinuous |
| Continuous | Discontinuous | — |
| Continuous | — | Discontinuous |
| Semi-continuous | Semi-continuous | Semi-continuous |
| Semi-continuous | Semi-continuous | Discontinuous |
| Semi-continuous | Semi-continuous | — |
| Semi-continuous | Discontinuous | Semi-continuous |
| Semi-continuous | Discontinuous | Discontinuous |
| Semi-continuous | — | Semi-continuous |
| Discontinuous | Continuous | Discontinuous |
| Discontinuous | Continuous | — |
| Discontinuous | Semi-continuous | Semi-continuous |
| Discontinuous | Semi-continuous | Discontinuous |
| Discontinuous | Discontinuous | Continuous |
| Discontinuous | Discontinuous | Semi-continuous |
| Discontinuous | Discontinuous | Discontinuous |
| Discontinuous | — | Continuous |
| — | Continuous | Discontinuous |
| — | Semi-continuous | Semi-continuous |
| — | Discontinuous | Continuous |

FIG. 3 shows yet another embodiment of the flexible structure 100 of the present invention, in which embodiment the second region 120 comprises a plurality of starch pillows, wherein at least some of the pillows comprises a starch dome portion 128 and a starch cantilever portion 129 extending from the starch dome portion 128. The starch cantilever portion 129 is elevated from the X-Y plane and extends, at an angle, from the dome portion 128, to form substantially void spaces, or "pockets," 115 between the first region 110, the starch domes 128 extending therefrom, and the starch cantilever portions 129.

In large part due to the existence of these substantially void pockets 115 capable of receiving and retaining significant amount of fluid, the flexible structure 100 schematically shown in FIG. 3 is believed to exhibit very high, for a given basis weight, absorbency characteristics. The pockets 115 are characterized by having none or very little amount of starch filaments therein.

One skilled in the art will appreciate that due to a process of making the flexible structure 100, as discussed below, and because of a highly flexible nature of the starch filaments and the flexible structure 100 as a whole, some amount of individual starch filaments present in the pockets 115 may be tolerable as long as those starch filaments do not interfere with the designed pattern of the structure 100 and its intended properties. In this context, the term "substantially" void pockets 115 is intended to recognize that due to a highly flexible nature of the structure 100 and individual starch filaments comprising the structure 100, some insignificant amount of starch filaments or their portions may be found in the pockets 115. A density of the pockets 115 is not greater than 0.005 gram per cubic centimeter (g/cc), more specifically, not greater than 0.004 g/cc, and still more specifically not greater than 0.003 g/cc.

In another aspect, the flexible structure 100 comprising the cantilever portions 129 is characterized by an enhanced overall surface area, relative to that of the comparable structure not having the cantilever portions 129. One skilled in the art will appreciate that the greater the number of the individual cantilever portions 129 and their respective microscopic surface areas, the greater a resulting microscopic specific surface area (i.e., the resulting microscopic surface area per unit of the overall macroscopic area of the structure disposed on a flat surface). As one skilled in the art will also recognize, the greater the absorption surface area of a structure, the greater the absorption capacity thereof, all other parameters being equal.

In embodiments of the structure 100 comprising cantilever portions 129, the cantilever portions 129 may comprise third regions of the structure 100. For example, an embodiment is contemplated in which a density of the starch cantilever portions 129 is intermediate a density of the first region 110 and a density of the second region 120 comprising the dome portion(s). In another embodiment, the density of the dome portion 128 can be intermediate a relatively high density of the first region 110 and a relatively low density of the cantilever portion 129. By analogy, the basis weight of the cantilever portion 129 can be equal to, intermediate, or greater than one or both of the first region 110 and the dome portion 128.

Process for Making Flexible Structure

Figure 8:
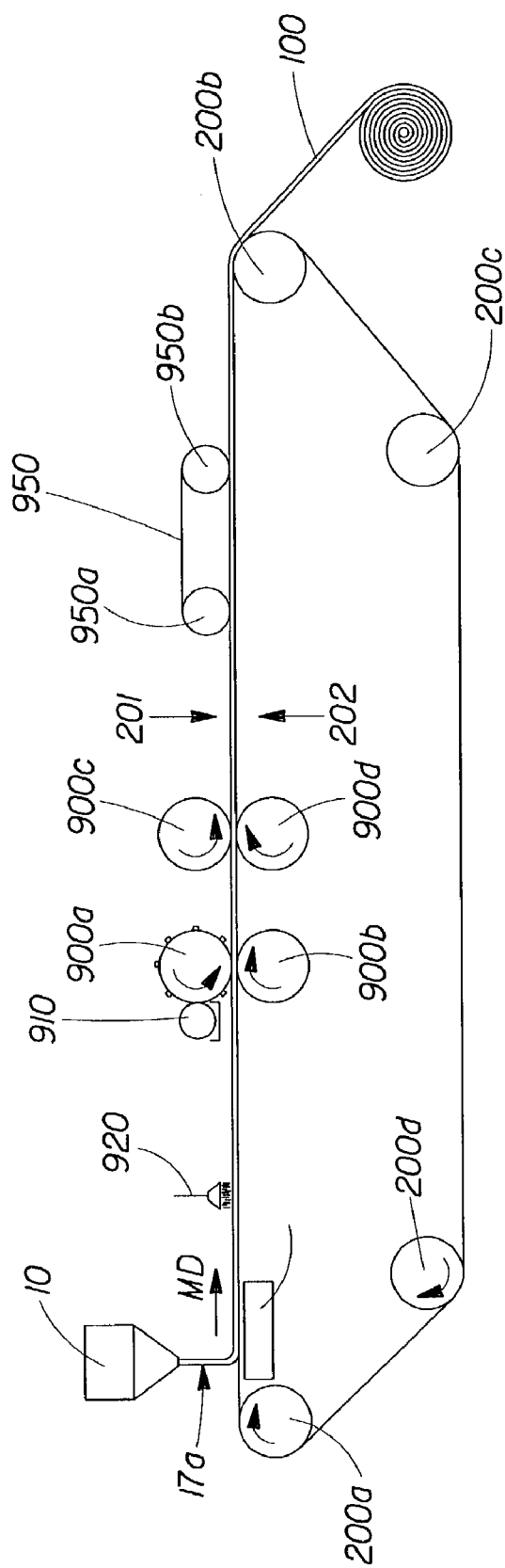
FIG. 8 is a schematic side-elevational view of an embodiment of a process of the present invention.
Figure 9:
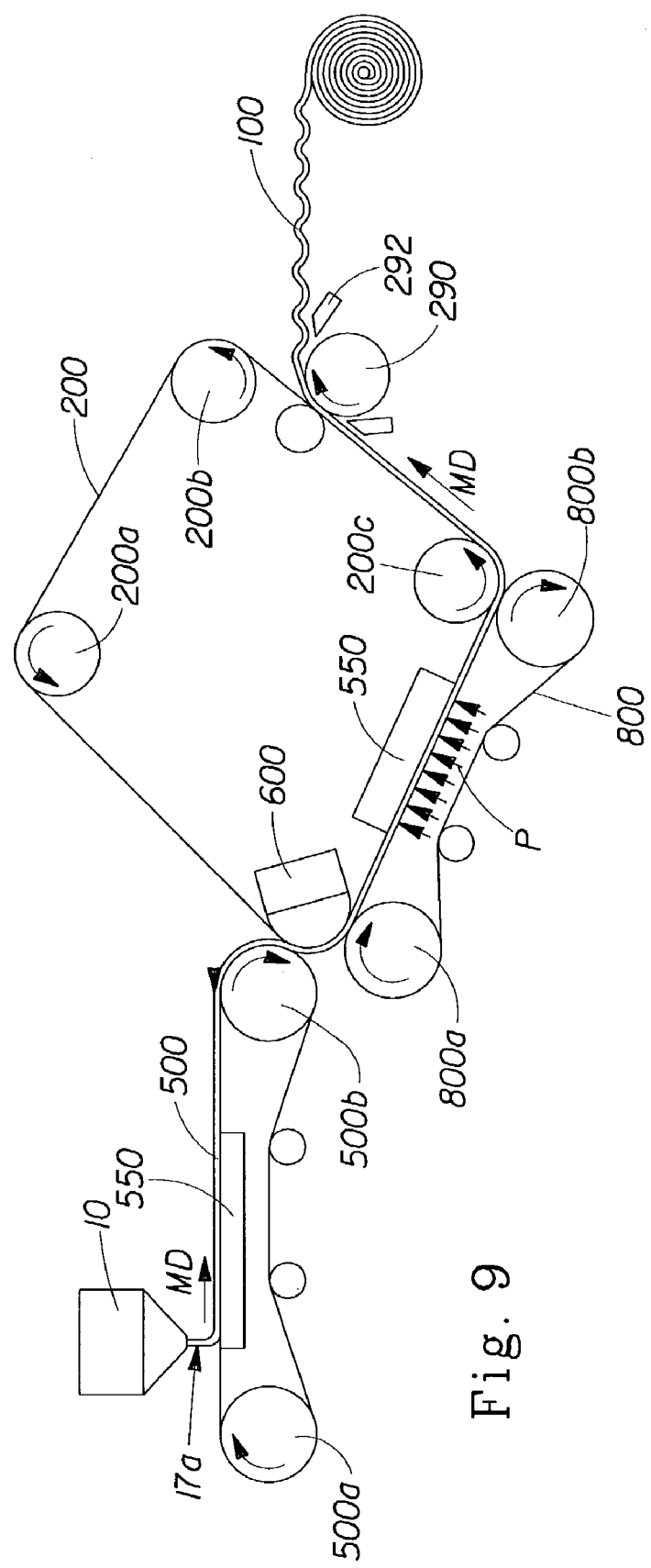
FIG. 9 is a schematic side-elevational view of another embodiment of a process of the present invention.

FIGS. 8 and 9 schematically show two embodiments of a process for making a flexible structure 100 comprising starch filaments.

First, a plurality of starch filaments is provided. The production of starch filaments for the flexible structure 100 according to the present invention can be made by a variety of techniques known in the art. For example, the starch filaments can be produced from the pseudo-thermoplastic melt starch compositions by various melt-spinning processes. Sizes of the starch filaments may vary, from about 0.001 dtex to about 135 dtex, more specifically from about 0.005 dtex to about 50 dtex, and even more specifically from about 0.01 dtex to about 5.0 dtex.

Some references, including U.S. Pat. No. 4,139,699 issued to Hernandez et al. on Feb. 13, 1979; U.S. Pat. No. 4,853,168 issued to Eden et al. on Aug. 1, 1989; and U.S. Pat. No. 4,234,480 issued to Hernandez et al. on Jan. 6, 1981. U.S. Pat. Nos. 5,516,815 and 5,316,578 to Buehler et al., relate to starch compositions for making starch filament using a melt-spinning process. The melt starch composition can be extruded through a spinnerette to produce filaments having diameters slightly enlarged relative to the diameter of the die orifices of the spinnerette (i.e., due to a die swell effect). The filaments are subsequently drawn down mechanically or thermomechanically by a drawing unit to reduce the fiber diameter.

Several devices for producing non-woven thermoplastic fabric structures from extruded polymers are known in the art and can be suitable for making long flexible starch filaments. For example, an extruded starch composition can be forced through a spinneret (not shown) forming a vertically oriented curtain of downwardly-advancing starch filaments. The starch filaments can be quenched with air in conjunction with a suction-type drawing or attenuating air slot. U.S. Pat. No. 5,292,239 issued to Zeldin, et al., on Mar. 8, 1994 discloses a device that reduces significant turbulence in the air flow in order to uniformly and consistently apply a drawing force to the starch filaments. The disclosure of that patent is incorporated by reference herein for the limited purposes of teaching ways and equipment for reducing turbulence in the air flow when forming starch filaments.

For the present invention, starch filaments can be produced from a mixture comprising starch, water, plasticizers, and other optional additives. For example, the suitable starch mixture can be converted to a pseudo-thermoplastic melt in an extruder and conveyed through a spinneret to a drawing unit forming a vertically oriented curtain of downward advancing starch filaments. The spinneret can comprise an assembly which is known in the art. The spinneret can include a plurality of nozzle bores with holes having cross-sectional areas suitable for starch filament production. The spinneret can be adapted to the fluidity of the starch composition so that every nozzle bore has the same rate of flow, if so desired. Alternatively, the rates of flow of differential nozzles can vary.

A drawing unit (not shown), can be located downstream of the extruder, and may comprise an open upper end, an open lower end opposite thereto, and an air supply manifold supplying compressed air to internal nozzles oriented in a downward direction. As compressed air flows through the internal nozzles, air is drawn into the open upper end of the drawing unit forming a rapidly moving stream of air flowing in the downward direction. The air stream produces a drawing force on the starch filaments causing them to be attenuated or stretched before exiting the open lower end of the drawing unit.

It has now been found that the starch filaments suitable for the flexible structure 100 can be produced by an electro-spinning process, wherein an electric field is applied to a starch solution to form charged starch jet. The electro-spinning process is known in the art. The dissertation entitled "The Electro-Spinning Process and Applications of Electro-Spun Fibers" by Doshi, Jayesh, Natwarlal, Ph.D., 1994, describes an electro-spinning process and conducts a study of the forces involved in the process. This dissertation also explores some commercial applications of the electro-spun filaments. This dissertation is incorporated herein by reference for the purposes of describing the principles of the electro-spinning processes.

U.S. Pat. No. 1,975,504 (Oct. 2, 1934); U.S. Pat. No. 2,123,992 (Jul. 19, 1938); U.S. Pat. No. 2,116,942 (May 10, 1938); U.S. Pat. No. 2,109,333 (Feb. 22, 1938); U.S. Pat. No. 2,160,962 (Jun. 6, 1939); U.S. Pat. No. 2,187,306 (Jan. 16, 1940); and U.S. Pat. No. 2,158,416 (May 16, 1939), all issued to Formhals, describe electro-spinning processes and equipment therefor. Other references describing electro-spinning processes include: U.S. Pat. No. 3,280,229 (Oct. 18, 1966) issued to Simons; U.S. Pat. No. 4,044,404 (Aug. 30,1977) issued to Martin et al.; U.S. Pat. No. 4,069,026 (Jan. 17, 1978) issued to Simm et al.; U.S. Pat. No. 4,143, 196 (Mar. 6, 1979) issued to Simm; U.S. Pat. No. 4,223,101 (Sep. 16, 1980) issued to Fine et al.; U.S. Pat. No. 4,230,650 (Oct. 28, 1980) issued to Guignard; U.S. Pat. No. 4,232,525 (Nov. 11, 1980) issued to Enjo et al.; U.S. Pat. No. 4,287,139 (Sep. 1, 1981) issued to Guignard; U.S. Pat. No. 4,323,525 (Apr. 6, 1982) issued to Bornat; U.S. Pat. No. 4,552,707 (Nov. 12, 1985) issued to How; U.S. Pat. No. 4,689,186 (Aug. 25, 1987) issued to Bornat; U.S. Pat. No. 4,798,607 (Jan. 17, 1989) issued to Middleton et al.; U.S. Pat. No. 4,904,272 (Feb. 27, 1990) issued to Middleton et al.; U.S. Pat. No. 4,968,238 (Nov. 6, 1990) issued to Satterfield et al.; U.S. Pat. No. 5,024,789 (Jan. 18, 1991) issued to Barry; U.S. Pat. No. 6,106,913 (Aug. 22, 2000) issued to Scardino et al.; and, U.S. Pat. No. 6,110,590 (Aug. 29, 2000) issued to Zarkoob et al. The disclosures of the foregoing patents are incorporated herein by reference for the limited purpose of describing the general principles of electro-spinning processes and equipment therefor.

While the foregoing references teach a variety of electro-spinning processes and equipment therefor, they fail to teach that a starch composition can be successfully processed and extruded into thin, substantially continuous starch filaments suitable for forming the flexible structure 100 of the present invention. Naturally occurring starch is not processible by an electro-spinning process, because natural starch generally has a granular structure. Now it has been discovered that a modified, "destructurized," starch composition can be successfully processed by using an electro-spinning process.

Commonly assigned patent application titled "Melt Processible Starch Composition" (Larry Neil Mackey et al., Attorney Docket #7967R), filed on the filing date of the present application, discloses a starch composition suitable for production of the starch filaments used in the flexible structure 100 of the present invention. That starch composition comprises starch having a weight-average molecular weight ranging from about 1,000 to about 2,000,000, and can contain a high polymer that is substantially compatible with starch and has a weight-average molecular weight of at least 500,000. In one embodiment, that starch composition can have from about 20% to about 99% by weight of amylopectin. The disclosure of this commonly-assigned application is incorporated herein by reference.

According to the present invention, a starch polymer can be mixed with water, plasticizers, and other additives, and a resulting melt can be processed (for example, extruded) and configured to produce starch filaments suitable for the flexible structure of the present invention. The starch filaments may have from a trace amount to one hundred percent of starch, or be a blend of starch and other suitable materials, such as, for example, cellulose, synthetic materials, proteins, and any combination thereof.

Starch polymers can include any naturally occurring starch, physically modified starch or chemically modified starch. Suitable naturally occurring starches can include, without limitation, corn starch, potato starch, sweet potato starch, wheat starch, sago palm starch, tapioca starch, rice starch, soybean starch, arrow root starch, bracken starch, lotus starch, waxy maize starch, high amylose corn starch, and commercial amylose powder. Naturally occurring starches, particularly corn starch, potato starch, and wheat starch, are the starch polymers of choice due to their availability.

Physically modified starch is formed by changing its dimensional structure. Physically modified starch can include o-starch, fractionated starch, moisture and heat treated starch and mechanically treated starch.

Chemically modified starch may be formed by reaction of its OH groups with alkylene oxides, and other ether-, ester-, urethane-, carbamate-, or isocyanate-forming substances. Hydroxyalkyl, acetyl, or carbamate starches or mixtures thereof are among embodiments of chemically modified starches. The degree of substitution of the chemically modified starch is from 0.05 to 3.0, and more specifically from 0.05 to 0.2.

A native water content can be from about 5% to about 16% by weight, and more specifically, from about 8% to about 12%. The amylose content of the starch is from 0% to about 80%, and more specifically, from about 20% to about 30%.

A plasticizer can be added to the starch polymer to lower the glass transition temperature of the starch filaments being made, thereby enhancing their flexibility. In addition, the presence of the plasticizer can lower the melt viscosity which in turn facilitates the melt extrusion process. The plasticizer is an organic compound having at least one hydroxyl group, such as, for example, a polyol. Sorbitol, mannitol, D-glucose, polyvinyl alcohol, ethylene glycol, polyethylene glycol, propylene glycol, polypropylene glycol, sucrose, fructose, glycerol and mixtures thereof have been found suitable. The examples of plasticizers include sorbitol, sucrose, and fructose in quantities ranging from about 0.1% by weight to about 70% by weight, more specifically from about 0.2% by weight to about 30% by weight, and still more specifically from about 0.5% by weight to about 10% by weight.

Other additives can be typically included with the starch polymer as a processing aid and to modify physical properties, such as, for example, elasticity, dry tensile strength, and wet strength, of the extruded starch filaments. Additives are typically present in quantities ranging from 0.1% to 70% by weight on a non-volatiles basis (meaning that the quantity is calculated by excluding volatiles such as water). The examples of additives include, without limitation, urea, urea derivatives, cross-linking agents, emulsifiers, surfactants, lubricants, proteins and their alkali salts, biodegradable synthetic polymers, waxes, low melting synthetic thermoplastic polymers, tackifying resins, extenders, and mixtures thereof. Examples of biodegradable synthetic polymers include, without limitation, polycaprolactone, polyhydroxybutyrates, polyhydroxyvalerates, polylactides, and mixtures thereof. Other additives include optical brighteners, antioxidants, flame retardants, dyes, pigments, and fillers. For the present invention, an additive comprising urea in quantities ranging from 0.5% to 60% by weight can beneficially be included in the starch composition.

Suitable extenders for use herein include gelatin; vegetable proteins, such as corn protein, sunflower protein, soybean proteins, cotton seed proteins; and water soluble polysaccharides, such as alginates, carrageenans, guar gum, agar, gum arabic and related gums, and pectin; and water soluble derivatives of cellulose, such as alkylcelluloses, hydroxyalkylcelluloses, carboxymethylcellulose, etc. Also, water soluble synthetic polymers such as polyacrylic acids, polyacrylic acid esters, polyvinylacetates, polyvinylalcohols, polyvinylpyrrolidone, etc., may be used.

Lubricant compounds may further be added to improve flow properties of the starch material during the process of the present invention. The lubricant compounds can include animal or vegetable fats, preferably in their hydrogenated form, especially those which are solid at room temperature. Additional lubricant materials include mono-glycerides and di-glycerides and phosphatides, especially lecithin. For the present invention, a lubricant compound that includes monoglyceride, glycerol mono-stearate is believed to be beneficial.

Further additives, including inorganic fillers, such as the oxides of magnesium, aluminum, silicon, and titanium, may be added as inexpensive fillers or processing aides. Additionally, inorganic salts, including alkali metal salts, alkaline earth metal salts, phosphate salts, etc., may be used as processing aides.

Other additives may be desirable depending upon the particular end use of the product contemplated. For example, in products such as toilet tissue, disposable towels, facial tissues and other similar products, wet strength is a desirable attribute. Thus, it is often desirable to add to the starch polymer cross-linking agents known in the art as "wet-strength" resins.

A general dissertation on the types of wet strength resins utilized in the paper art can be found in TAPPI monograph series No. 29, Wet Strength in Paper and Paperboard, Technical Association of the Pulp and Paper Industry (New York, 1965), which is incorporated herein by reference. The most useful wet strength resins have generally been cationic in character. Polyamide-epichlorohydrin resins are cationic polyamide amine-epichlorohydrin wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim, the disclosures of which are incorporated herein by reference. One commercial source of a useful polyamide-epichlorohydrin resin is Hercules, Inc. of Wilmington, Del., which markets such resins under the mark Kymene™.

Glyoxylated polyacrylamide resins have also been found to be of utility as wet strength resins. These resins are described in U.S. Pat. No. 3,556,932, issued on Jan. 19, 1971, to Coscia, et al. and U.S. Pat. No. 3,556,933, issued on Jan. 19, 1971, to Williams et al., the disclosures of which are incorporated herein by reference. One commercial source of glyoxylated polyacrylamide resins is Cytec Co. of Stanford, Conn., which markets one such resin under the mark Parez™ 631 NC.

Still other water-soluble cationic resins that can be used in this invention are urea formaldehyde and melamine formaldehyde resins. The more common functional groups of these polyfunctional resins are nitrogen containing groups such as amino groups and methylol groups attached to nitrogen. Polyethylenimine type resins may also find utility in the present invention. In addition, temporary wet strength resins such as Caldas 10 (manufactured by Japan Carlit) and CoBond 1000 (manufactured by National Starch and Chemical Company) may be used in the present invention.

For the present invention, one cross-linking agent is the wet strength resin Kymene™, in quantities ranging from about 0.1% by weight to about 10% by weight, and more specifically from about 0.1% by weight to about 3% by weight.

In order to produce suitable starch filaments for the flexible structure 100 of the present invention, the starch compostion should exhibit certain Theological behavior during processing, such as a certain extensional viscosity and a certain capillary number. Of course, the type of processing (e. g., melt-blowing, electro-spinning, etc.), can dictate the required rheological qualities of the starch composition.

Extensional, or elongational, viscosity ($\eta_e$) relates to melt extensibility of the starch composition, and is particularly important for extensional processes such as starch filament making. The extensional viscosity includes three types, depending on the type of deformation of the composition: uniaxial or simple extensional viscosity, biaxial extensional viscosity, and pure shear extensional viscosity. The uniaxial extensional viscosity is especially important for uniaxial extensional processes such as mechanical elongation, melt-blowing, spun-bonding, and electro-spinning. The other two extensional viscosities are important for the biaxial extension or forming processes for making films, foams, sheets or parts.

For conventional fiber spinning thermoplastics such as polyolefins, polyamides and polyesters, there is a strong correlation between extensional viscosity and shear viscosity of these conventional thermoplastic materials and blends thereof. That is, the spinnability of the material can be determined simply by the melt shear viscosity, even though the spinnablity is a property controlled primarily by melt extensional viscosity. The correlation is quite robust such that the fiber industry has relied on the melt shear viscosity in selecting and formulating melt spinnable materials. The melt extensional viscosity has rarely been used as an industrial screening tool.

It is therefore surprising to find that the starch compositions of the present invention do not necessarily exhibit such a correlation between shear and extensional viscosities. The starch compositions herein exhibit melt flow behavior typical of a non-Newtonian fluid and as such may exhibit a strain hardening behavior, that is, the extensional viscosity increases as the strain or deformation increases.

For example, when a high polymer selected according to the present invention is added to a starch composition, the shear viscosity of the composition remains relatively unchanged, or even decreases slightly. Based on conventional wisdom, such a starch composition would be expected to exhibit decreased melt processability and would not be expected to be suitable for melt-extensional processes. However, it was surprisingly found that the starch composition herein shows a significant increase in extensional viscosity when even a small amount of high polymer is added. Consequently, the starch composition herein is found to have enhanced melt extensibility and is suitable for melt extensional processes, especially those including melt-blowing, spun-bonding, and electro-spinning.

A starch composition having a shear viscosity, measured according to the Test Method disclosed hereinafter, of less than about 30 Pascal·second (Pa·s), more specifically from about 0.1 Pa·s to about 10 Pa·s, and even more specifically from about 1 to about 8 Pa·s, is useful in the melt attenuation processes herein. Some starch compositions herein may have low melt viscosity such that they may be mixed, conveyed, or otherwise processed in traditional polymer processing equipment typically used for viscous fluids, such as a stationary mixer equipped with metering pump and spinneret. The shear viscosity of the starch composition may be effectively modified by the molecular weight and molecular weight distribution of the starch, the molecular weight of the high polymer, and the amount of plasticizers and/or solvents used. It is believed that reducing the average molecular weight of the starch is an effective way to lower the shear viscosity of the composition.

In one embodiment of the present invention, the melt-processable starch compositions have an extensional viscosity in the range of from about 50 Pa·s to about 20,000 Pa·s, more specifically from about 100 Pa·s to about 15,000 Pa·s, more specifically from about 200 Pa·s to about 10,000 Pa·s, and even more specifically from about 300 Pa·s to about 5,000 Pa·s and yet more specifically from about 500 Pa·s to about 3,500 Pa·s at a certain temperature. The extensional viscosity is calculated according to the method set forth hereinafter in the Analytical Methods section.

Many factors can affect the rheological (including the extensional viscosity) behavior of the starch composition. Such factors include, without limitation: the amount and the type of polymeric components used, the molecular weight and molecular weight distribution of the components, including the starch and the high polymers, the amylose content of the starch, the amount and type of additives (e.g., plasticizers, diluents, processing aids), the type of processing (e. g., melt-blowing or electro-spinning) and the processing conditions, such as temperature, pressure, rate of deformation, and relative humidity, and in the case of non-Newtonian materials, the deformation history (i.e., a time or strain history dependence). Some materials can strain-harden, i. e., their extensional viscosity increases as the strain increases. This is believed to be due to stretching of an entangled polymer network. If stress is removed from the material, the stretched entangled polymer network relaxes to a lower level of strain, depending on the relaxation time constant, which is a function of temperature, polymer molecular weight, solvent or plasticizer concentration, and other factors.

The presence and properties of high polymers can have a significant effect on the extensional viscosity of the starch composition. The high polymers useful for enhancing the melt extensibility of the starch composition used in the present invention are typically high molecular weight, substantially linear polymers. Moreover, high polymers that are substantially compatible with starch are most effective in enhancing the melt extensibility of the starch composition.

It has been found that starch compositions useful for melt extensional processes typically have their extensional viscosity increased by a factor of at least 10 when a selected high polymer is added to the composition. Typically, the starch compositions of present invention show an increase in the extensional viscosity of a factor of about 10 to about 500, more specifically of about 20 to about 300, still more specifically from about 30 to about 100, when a selected high polymer is added. The higher the level of the high polymer, the greater the increase in extensional viscosity. High polymer can be added to adjust the extensional viscosity to a value of 200 to 2000 Pa·sec at a Hencky strain of 6. For example, polyacrylamide having molecular weight (MW) from 1 million to 15 million at a level of 0.001% to 0.1% can be added to comprise the starch composition.

The type and level of starch that is employed can also have an impact on the extensional viscosity of the starch composition. In general, as the amylose content of the starch decreases, the extensional viscosity increases. Also, in general, as the molecular weight of the starch within the prescribed range increases, the extensional viscosity increases. Lastly, in general, as the level of starch in the compositions increases, the extensional viscosity increases. (Conversely, in general, as the level of additive in the compositions increases, the extensional viscosity decreases).

Temperature of the starch composition can significantly affect the extensional viscosity of the starch composition. For the purposes of the present invention, all conventional means of controlling the temperature of the starch composition can be utilized, if suitable for a particular process employed. For example, in the embodiments wherein the starch filaments are produced by extrusion through a die, the die temperature can have a significant impact on the extensional viscosity of the starch compositions being extruded therethrough. In general, as the temperature of the starch composition increases, the extensional viscosity of the starch composition decreases. The temperature of the starch composition can range form about 20° C. to about 180° C., more specifically from about 20° C. to about 90° C., and even more specifically from about 50° C. to about 80° C. It is to be understood that the presence or absence of solids in the starch composition can affect the required temperature thereof.

The Trouton ratio (Tr) can be used to express the extensional flow behavior. The Trouton ratio is defined as the ratio between the extensional viscosity ($\eta_e$) and the shear viscosity ($\eta_S$), $$Tr = \eta_e(\dot{\epsilon}, t)/\eta_S,$$

wherein the extensional viscosity $\eta_e$ is dependent on the deformation rate ($\dot{\epsilon}$) and time (t). For a Newtonian fluid, the uniaxial extension Trouton ratio has a constant value of 3. For a non-Newtonian fluid, such as the starch compositions herein, the extensional viscosity is dependent on the deformation rate ($\dot{\epsilon}$) and time (t). It has also been found that melt processable compositions of the present invention typically have a Trouton ratio of at least about 3. Typically, the Trouton ratio ranges from about 10 to about 5,000, specifically from about 20 to about 1,000, and more specifically from about 30 to about 500, when measured at a processing temperature and an extension rate of 700s$^{-1}$ at a Hencky strain of 6.

Applicants have also found that in the embodiments in which the starch filaments are produced by extrusion, the capillary number (Ca) of the starch composition, as it passes through the extrusion die, is important for melt processability. The capillary number is a number representing the ratio of the viscous fluid forces to surface tension forces. Near the exit of a capillary die, if the viscous forces are not significantly larger than the surface tension forces, the fluid filament will break into droplets, which is commonly termed "atomization." The Capillary Number is calculated according to the following equation:

$$Ca = (\eta_s \cdot Q)/(\pi \cdot r^2 \cdot \sigma)$$

where $\eta_s$ is the shear viscosity in Pascal·seconds measured at a shear rate of 3000 s$^{-1}$; Q is the volumetric fluid flow rate through capillary die in m$^3$/s; r is the radius of the capillary die in meters (for non-circular orifices, the equivalent diameter/radius can be used); and a is the surface tension of the fluid in Newtons per meter.

Because the capillary number is related to shear viscosity as described above, it is influenced by the same factors that affect shear viscosity and in a similar way. As used herein, the term "inherent" in conjunction with capillary number or surface tension indicates properties of a starch composition not influenced by outside factors, such for example, as presence of an electric field. The term "effective" indicates the properties of the starch composition that has been influenced by outside factors, such for example, as presence of an electric to field.

In one embodiment of the present invention, the melt-processable starch compositions have an inherent capillary number as they pass through the die of at least 0.01 and an effective capillary number of at least 1.0. Without electrostatics, the capillary number needs to be greater than 1 for stability, and preferably greater than 5 for robust stability of the filament being formed. With electrostatics, charge repulsion counteracts the effect of surface tension so the inherent capillary number, measured without an electrical charge present, can be less than 1. When an electric potential is applied to the filament being formed the effective surface tension is decreased and the effective capillary number is increased based on the following equations:

While capillary number may be expressed in varying forms, a representative equation, that can be used to determine the inherent capillary number of a material, is:

$$Ca_{inherent} = \eta_s \cdot v / \sigma,$$

where:
  $Ca_{inherent}$ is an inherent capillary number
  $\eta_s$ is a shear viscosity of the fluid
  v is a the linear velocity of the fluid
  σ is a surface tension of the fluid As it pertains to the current invention, a representative sample had the following composition and properties.

Formula

| | |
|---|---|
| Purity Gum 59 from National Starch Inc. | 40.00% |
| Deionized Water | 59.99% |
| Superfloc N-300 LMW from Cytec (high 0.01% molecular weight polyacrylamide) | |

-continued

| | |
|---|---|
| Run Temperature | 120° F. |
| Shear Viscosity at 3000S-1 | 0.1 Pa · s |
| nozzle diameter | .0254 cm |
| Linear Velocity | .236 in/sec |
| Inherent Surface Tension | 72 dynes/cm |

Experimentally, without an electrostatic charge on the fluid, this material will flow through the nozzle tip, form small droplets and then drop under the force of gravity in discreet drops. As an electric potential on the system is increased the drops become smaller in size and begin to accelerate towards the grounding mechanism. When the electric potential, (25 Kilovolts for this sample) reaches a critical value the drop no longer forms at the tip of the nozzle and a small continuous fiber is expelled from the nozzle tip. Thus the applied electric potential has now overcome the surface tension forces eliminating the capillary failure mode. The effective capillary number is now greater than 1. Laboratory experiments, with the described solution and experimental setup, produced essentially continuous fibers. The fibers were collected on a vacuum screen in the form of a fiber mat. Analysis via optical microscopy showed the resulting fibers were continuous and had diameters ranging from 3 to 5 microns.

In some embodiments, the inherent capillary number can be at least 1, more specifically, from 1 to 100, still more specifically from about 3 to about 50, and yet still more specifically from about 5 to about 30.

The starch composition herein is processed in a flowable state, which typically occurs at a temperature at least equal to or higher than its "melting temperature." Therefore, the processing temperature range is controlled by the "melting temperature" of the starch composition, which is measured according to the Test Method described in detail herein. The melting temperature of the starch composition herein ranges from about 20° C. to about 180° C., more specifically from about 30° C. to about 130° C., and still more specifically from about 50° C. to about 90° C. The melting temperature of the starch composition is a function of the amylose content of the starch (higher amylose content requires higher melting temperature), the water content, the plasticizer content and the type of plasticizer.

Exemplary uniaxial extensional processes suitable for the starch compositions include melt spinning, melt blowing, and spun bonding. These processes are described in detail in U.S. Pat. No. 4,064,605, issued on Dec. 27, 1977 to Akiyama et al.; U.S. Pat. No. 4,418,026, issued on Nov. 29, 1983 to Blackie et al.; U.S. Pat. No. 4,855,179, issued on Aug. 8, 1989 to Bourland et al.; U.S. Pat. No. 4,909,976, issued on Mar. 20, 1990 to Cuculo et al.; U.S. Pat. No. 5,145,631, issued on Sep. 8, 1992 to Jezic; U.S. Pat. No. 5,516,815, issued on May 14, 1996 to Buehler et al.; and U.S. Pat. No. 5,342,335, issued on Aug. 30, 1994 to Rhim et al.; the disclosures of all of the above are incorporated herein by reference.

Figure 7:
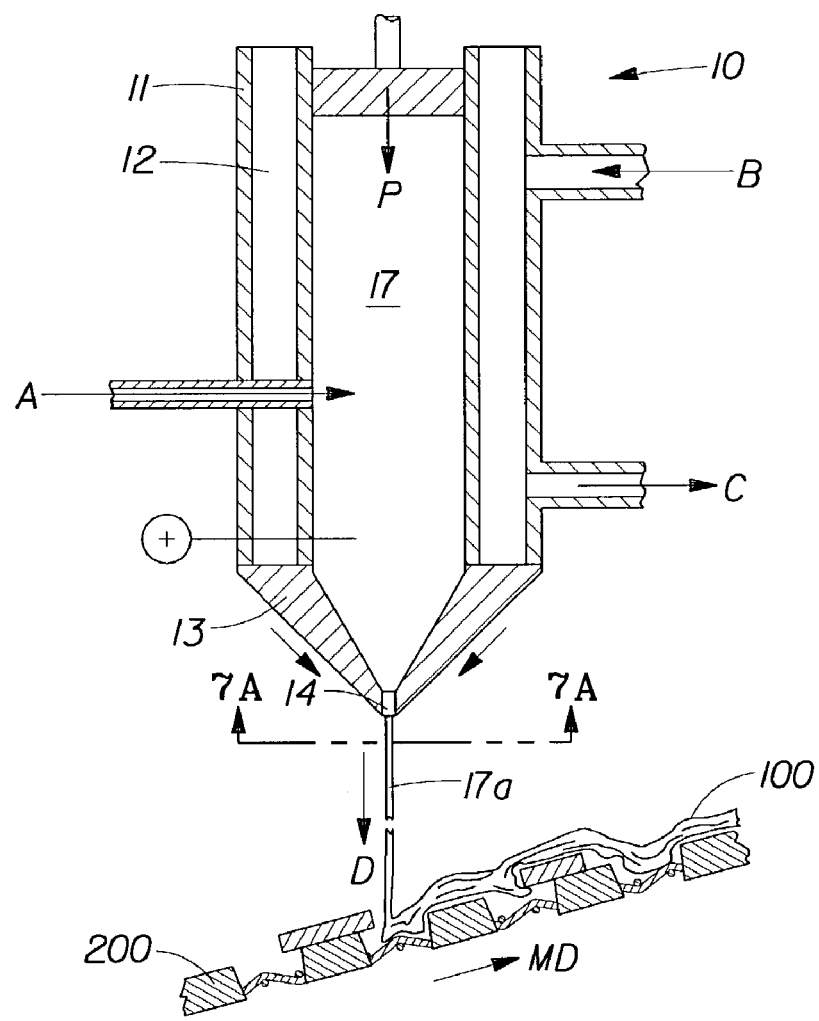
FIG. 7 is a schematic partial side-elevational and cross-sectional view of an embodiment of an electro-spinning process and apparatus of making flexible structure comprising starch filaments.

Schematically shown in FIGS. 7, 8 and 9, is an apparatus 10 for producing starch filaments suitable for the flexible structure 100 of the present invention. The apparatus 10 may comprise, for example, a single-screw or twin-screw extruder, positive displacement pump, or a combination thereof, as is known in the art. The starch solution can have a total water content, i.e. water of hydration plus added water, in the range of from about 5% to about 80%, and more specifically in the range of from about 10% to about 60% relative to a total weight of the starch material. The starch material is heated to elevated temperatures sufficient to form a pseudo-thermoplastic melt. Such temperature is typically higher than the glass transition and/or melting temperature of the formed material. The pseudo-thermoplastic melts of the invention are polymeric fluids having a shear rate dependent viscosity, as known in the art. The viscosity decreases with increasing shear rate as well as with increasing temperature.

The starch material can be heated in a closed volume in the presence of a low concentration of water, to convert the starch material to a pseudo-thermoplastic melt. The closed volume can be a closed vessel or the volume created by the sealing action of the feed material as happens in the screw of extrusion equipment. Pressures created in the closed vessel will include pressures due to the vapor pressure of water as well as, pressures generated due to compression of materials in the screw-barrel of the extruder.

A chain scission catalyst, which reduces the molecular weight by splitting the glycosidic bonds in the starch macromolecules resulting in a reduction of the average molecular weight of the starch, may be used to reduce the viscosity of the pseudo-thermoplastic melt. Suitable catalysts include inorganic and organic acids. Suitable inorganic acids include hydrochloric acid, sulfuric acid, nitric acid, phosphoric acid, and boric acid as well as the partial salts of polybasic acids, e.g. $NaHSO_4$ or $NaH_2 PO_4$ etc. Suitable organic acids include formic acid, acetic acid, propionic acid, butyric acid, lactic acid, glycolic acid, oxalic acid, citric acid, tartaric acid, itaconic acid, succinic acid, and other organic acids known in the art, including partial salts of the polybasic acids. Hydrochloric acid, sulfuric acid, and citric acid, including mixtures thereof can be beneficially used in the present invention.

The reduction of the molecular weight of the non-modified starch used can be by a factor of from 2 to 5000, and more specifically by a factor of from 4 to 4000. The concentration of catalysts is in the range of $10^{-6}$ to $10^{-2}$ mole of catalyst per mole of anhydro-glucose unit, and more specifically between $0.1 \times 10^{-3}$ to $5 \times 10^{-3}$ mole of catalyst per mole of anhydro-glucose unit of starch.

In FIG. 7, the starch composition is supplied into the apparatus 10 for electro-spinning production of starch filaments used in making the flexible structure 100 of the present invention. The apparatus 10 comprises a housing 11 structured and configured to receive (arrow A) the starch composition 17 that can be maintained therein and extruded (arrow D) into starch filaments 17a through a jet 14 of a die head 13. An annular cavity 12 can be provided to circulate (arrows B and C) a heating fluid that heats the starch composition to a desired temperature. Other means for heating well known in the art, such as, those using electro-heating, pulse combustion, water- and steam-heating, etc., can be used to heat the starch composition.

The electric field can be applied directly to the starch solution, for example, through a electrically-charged probe, or to the housing 11 and/or extrusion die 13. If desired, the molding member 200 can be electrically charged with the electric charge opposite to the charge of the starch filaments being extruded. Alternatively, the molding member can be grounded. The electric differential can be from 5 kV to 60 kV, and more specifically from 20 kV to 40 kV.

The plurality of extruded starch filaments can then be deposited to the molding member 200 traveling in a machine direction MD, at a certain distance from the apparatus 10. This distance should be sufficient to allow the starch filaments to elongate and then dry, and at the same time maintain a differential charge between the starch filaments exiting the jet nozzle 14 and the molding member 200. For that purpose, a stream of drying air can be applied to the plurality of starch filaments to cause the plurality of starch filaments to turn at an angle. This would allow one to maintain a minimal distance between the jet nozzle 14 and the molding member 200—for the purposes of maintaining a differential charge therebetween, and at the same time, to maximize the length of a portion of the filaments between the nozzle and the molding member 200—for the purposes of effectively drying the filaments. In such an arrangement, the molding member 200 can be disposed at an angle relative to a direction of the fiber filaments when they exit the jet nozzle 14 (arrow D in FIG. 7).

Figure 7A:
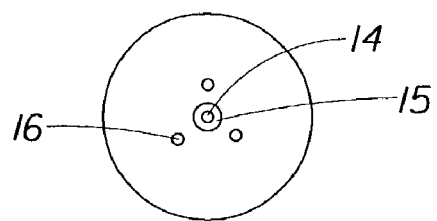
FIG. 7A is a schematic view taken along line 7A—7A of FIG. 7.

Optionally, attenuating air can be used in combination with an electrostatic force to provide the drawing force causing the starch filaments to be attenuated, or stretched, prior to being deposited to the molding member 200. FIG. 7A schematically shows an exemplary embodiment of the die head provided with one annular orifice 15 encompassing the jet nozzle 14, and three other orifices 16 equally spaced at 120° around the jet nozzle 14, for attenuating air. Of course, other arrangements of the attenuating air, as known in the art, are contemplated in the present invention.

According to the present invention, the starch filaments can have a size ranging from about 0.01 decitex to about 135 decitex, more specifically from about 0.02 decitex to about 30 decitex, and even more specifically from about 0.02 decitex to about 5 decitex. Starch filaments can have various cross-sectional shapes, including, but not limited to, circular, oval, rectangular, triangular, hexagonal, cross-like, star-like, irregular, and any combinations thereof. One skilled in the art will understand that such a variety of shapes can be formed by differential shapes of die nozzles used to produce the starch filaments.

Figure 10:
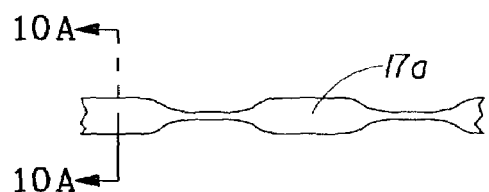
FIG. 10 is a schematic view of a fragment of an embodiment of a starch filament having differential cross-sectional areas perpendicular to the filament's major (longitudinal) axis.
Figure 10A:
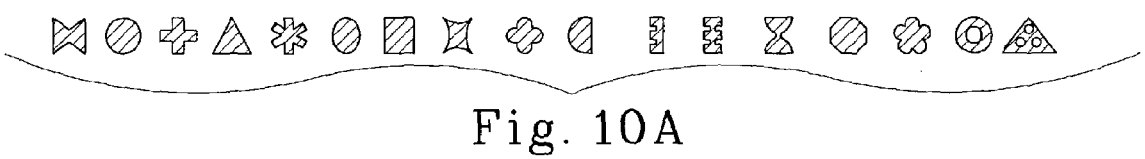
FIG. 10A is a schematic view of several exemplary, non-exclusive, embodiments of a cross-sectional area of a starch filament.

FIG. 10A schematically shows, without limitation, some possible cross-sectional areas of the starch filaments. The starch filament's cross-sectional area is an area perpendicular to the starch filament's major axis and outlined by a perimeter formed by the starch filament's outside surface in a plane of the cross-section. It is believed that the greater the surface area of the starch filament (per a unit of length or weight thereof) the greater the opacity of the flexible structure 100 comprising the starch filaments. Therefore, it is believed that maximizing the surface area of the starch filaments by increasing the starch filaments' equivalent diameter can be beneficial to increase the opacity of the resulting flexible structure 100 of the present invention. One way of increasing the starch filaments' equivalent diameter comprises forming starch filaments having non-circular, multi-surface, cross-sectional shapes.

Furthermore, starch filaments need not have a uniform thickness and/or cross-sectional area throughout the filament's length or a portion thereof. FIG. 10, for example, schematically shows a fragment of the starch filament having a differential cross-sectional area along its length. Such differential cross-sectional areas can be formed by, for example, varying pressure within a die, or by changing at least one of the characteristics (such as, velocity, direction, etc.) of attenuating air or drying air in a melt-blowing process, or a combination meltblowing and electro-spinning process.

Some starch filaments may have "notches" distributed at certain intervals along the filament's length or a portion thereof. Such variations in the starch filaments' cross-sectional area along the filaments' length are believed to encourage flexibility of the filaments, facilitate the filaments' ability to mutually entangle in the flexible structure 100 being made, and positively influence the softness and flexibility of the resulting flexible structure 100 being made. The notches, or other beneficial irregularities in the starch filaments can be formed by contacting the starch filaments with a surface having sharp edges or protrusions, as described below.

The next step of the process comprises providing a molding member 200. The molding member 200 can comprise a patterned cylinder (not shown) or other pattern-forming member, such as a belt or a band. The molding member 200 comprises a filament-contacting side 201 and a backside side 202 opposite to the filament-contacting side 201. A fluid pressure differential (for example, a vacuum pressure, that can be present beneath the belt or within the drum) can force the starch filaments into the pattern of the molding member to form the distinguishable regions within the flexible structure being made.

In the course of a process of making the structure 100 of the present invention, the starch filaments are deposited onto the filament-contacting side 201. The second side 202 typically contacts the equipment, such as support rolls, guiding rolls, a vacuum apparatus, etc., as required by a specific process. The filament-contacting side 201 comprises a three-dimensional pattern of protrusions and/or depressions. Typically (although not necessarily), that pattern is non-random and repeating. The three-dimensional pattern of the filament contacting side 201 can comprise a substantially continuous pattern (FIG. 4), a substantially semi-continuous pattern (FIG. 5), a pattern comprising a plurality of discrete protuberances (FIG. 5), or any combination thereof. When the plurality of starch filaments is deposited onto the filament contacting side 201 of the molding member 200, the plurality of flexible starch filaments at least partially conforms to the molding pattern of the molding member 200.

The molding member 200 can comprise a belt or band that is macroscopically monoplanar when it lies in a reference X-Y plane, wherein a Z-direction is perpendicular to the X-Y plane. Likewise, the flexible flexible structure 100 can be thought of as macroscopically monoplanar and lying in a plane parallel to the X-Y plane. Perpendicular to the X-Y plane is the Z-direction along which extends a caliper, or thickness, of the flexible structure 100, or elevations of the differential regions of the molding member 200 or of the flexible structure 100.

If desired, the molding member 200 comprising a belt may be executed as a press felt. A suitable press felt for use according to the present invention may be made according to the teachings of U.S. Pat. No. 5,549,790, issued Aug. 27, 1996 to Phan; U.S. Pat. No. 5,556,509, issued Sep. 17, 1996 to Trokhan et al.; U.S. Pat. No. 5,580,423, issued Dec. 3, 1996 to Ampulski et al.; U.S. Pat. No. 5,609,725, issued Mar. 11, 1997 to Phan; U.S. Pat. No. 5,629,052 issued May 13, 1997 to Trokhan et al.; U.S. Pat. No. 5,637,194, issued Jun. 10, 1997 to Ampulski et al.; U.S. Pat. No. 5,674,663, issued Oct. 7, 1997 to McFarland et al.; U.S. Pat. No. 5,693,187 issued Dec. 2, 1997 to Ampulski et al.; U.S. Pat. No. 5,709,775 issued Jan. 20, 1998 to Trokhan et al.; U.S. Pat. No. 5,776,307 issued Jul. 7, 1998 to Ampulski et al.; U.S. Pat. No. 5,795,440 issued Aug. 18, 1998 to Ampulski et al.; U.S. Pat. No. 5,814,190 issued Sep. 29, 1998 to Phan; U.S. Pat. No. 5,817,377 issued Oct. 6, 1998 to Trokhan et al.; U.S. Pat. No. 5,846,379 issued Dec. 8, 1998 to Ampulski et al.; U.S. Pat. No. 5,855,739 issued Jan. 5, 1999 to Ampulski et al.; and U.S. Pat. No. 5,861,082 issued Jan. 19, 1999 to Ampulski et al., the disclosures of which are incorporated herein by reference. In an alternative embodiment, the molding member 200 may be executed as a press felt according to the teachings of U.S. Pat. No. 5,569,358 issued Oct. 29, 1996 to Cameron.

Figure 4:
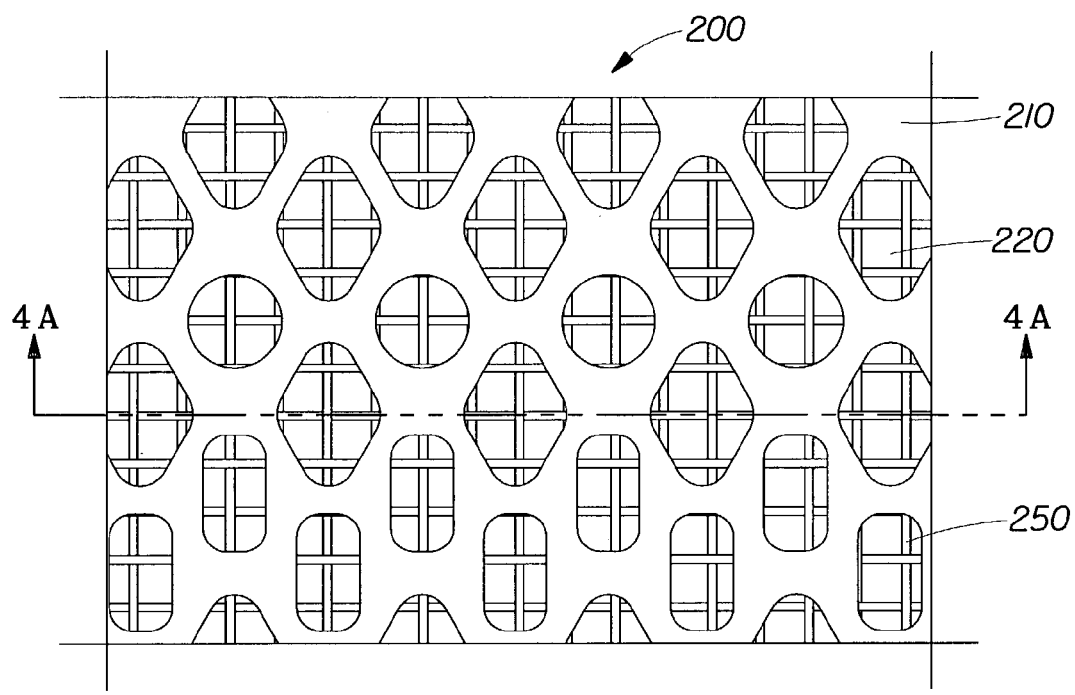
FIG. 4 is a schematic plan view of an embodiment of a molding member that can be used to form the flexible structure of the present invention.
Figure 5:
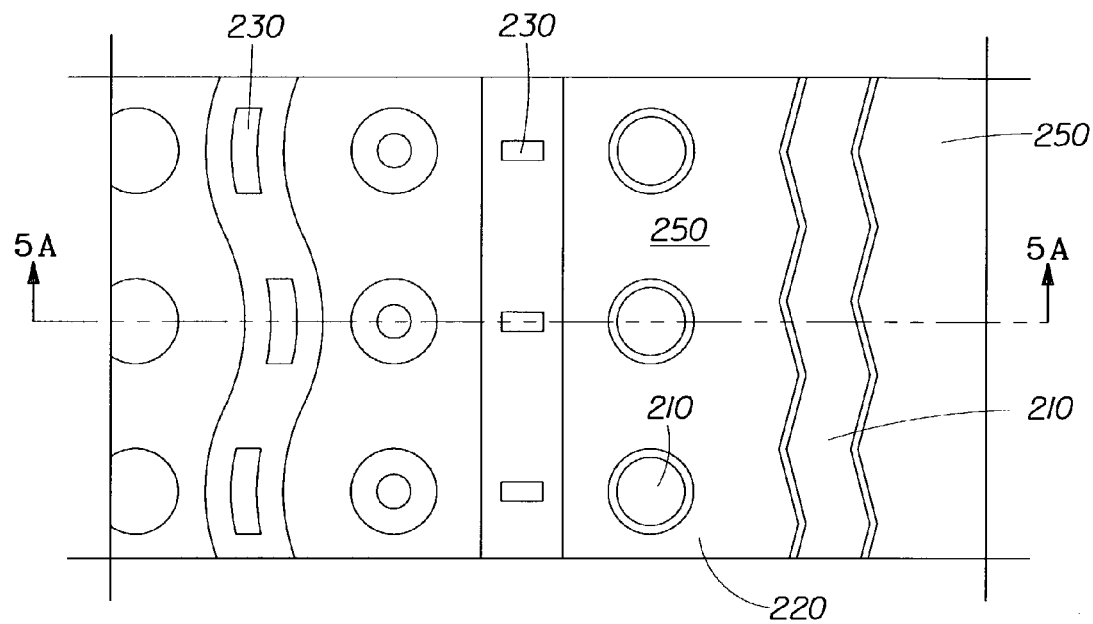
FIG. 5 is a schematic plan view of another embodiment of the molding member that can be used to form the flexible structure of the present invention.

One principal embodiment of the molding member 200 comprises a resinous framework 210 joined to a reinforcing element 250. The resinous framework 210 can have a certain pre-selected pattern. For example, FIG. 4 shows the substantially continuous framework 210 having a plurality of apertures 220 therethrough. In some embodiments, the reinforcing element 250 can be substantially fluid-permeable. The fluid-permeable reinforcing element 250 may comprise a woven screen, or an apertured element, a felt, or any combination thereof. The portions of the reinforcing element 250 registered with apertures 220 in the molding member 200 prevent starch filaments from passing through the molding member 200, and thereby reduce the occurrences of pinholes in the resulting flexible structure 100. If one does not wish to use a woven fabric for the reinforcing element 250, a nonwoven element, screen, net, press felt or a plate or film having a plurality of holes therethrough may provide adequate support and strength for the framework 210. Suitable reinforcing element 250 may be made according to U.S. Pat. No. 5,496,624, issued Mar. 5, 1996 to Stelljes, et al., U.S. Pat. No. 5,500,277 issued Mar. 19, 1996 to Trokhan et al., and U.S. Pat. No. 5,566,724 issued Oct. 22, 1996 to Trokhan et al., the disclosures of which are incorporated herein by reference.

Various types of the fluid-permeable reinforcing element 250 are described in several US patents, for example, U.S. Pat. Nos. 5,275,700 and 5,954,097, the disclosures of which are incorporated herein by reference. The reinforcing element 250 may comprise a felt, also referred to as a "press felt" as is used in conventional papermaking. The framework 210 may be applied to the reinforcing element 250, as taught by U.S. Pat. No. 5,549,790, issued Aug. 27, 1996 to Phan; U.S. Pat. No. 5,556,509, issued Sep. 17, 1996 to Trokhan et al.; U.S. Pat. No. 5,580,423, issued Dec. 3, 1996 to Ampulski et al.; U.S. Pat. No. 5,609,725, issued Mar. 11, 1997 to Phan; U.S. Pat. No. 5,629,052 issued May 13, 1997 to Trokhan et al.; U.S. Pat. No. 5,637,194, issued Jun. 10, 1997 to Ampulski et al.; U.S. Pat. No. 5,674,663, issued Oct. 7,1997 to McFarland et al.; U.S. Pat. No. 5,693,187 issued Dec. 2, 1997 to Ampulski et al.; U.S. Pat. No. 5,709,775 issued Jan. 20, 1998 to Trokhan et al., U.S. Pat. No. 5,795,440 issued Aug. 18, 1998 to Ampulski et al., U.S. Pat. No. 5,814,190 issued Sep. 29, 1998 to Phan; U.S. Pat. No. 5,817,377 issued Oct. 6, 1998 to Trokhan et al.; and U.S. Pat. No. 5,846,379 issued Dec. 8, 1998 to Ampulski et al., the disclosures of which are incorporated herein by reference.

Alternatively, the reinforcing element 250 may be fluid-impermeable. The fluid-impermeable reinforcing element 250 can comprise, for example, a polymeric resinous material, identical to, or different from, the material used for making a framework 210 of the molding member 200 of the present invention; a plastic material; a metal; any other suitable natural or synthetic material; or any combination thereof. One skilled in the art will appreciate that the fluid-impermeable reinforcing element 250 will cause the molding member 10, as a whole, to be also fluid-impermeable. It is to be understood that the reinforcing element 250 may be partially fluid-permeable and partially fluid-impermeable. That is, some portion of the reinforcing element 250 may be fluid-permeable, while another portion of the reinforcing element 250 may be fluid-impermeable. The molding member 200, as a whole, can be fluid-permeable, fluid-impermeable, or partially fluid-permeable. In a partially fluid-permeable molding member 200, only a portion or portions of a macroscopical area or areas of the molding member 200 is fluid-permeable.

If desired, the reinforcing element 250 comprising a Jacquard weave can be utilized. Illustrative belts having the Jacquard weave can be found in U.S. Pat. No. 5,429,686 issued Jul. 4, 1995 to Chiu, et al.; U.S. Pat. No. 5,672,248 issued Sep. 30, 1997 to Wendt, et al.; U.S. Pat. No. 5,746,887 issued May 5, 1998 to Wendt, et al.; and U.S. Pat. No. 6,017,417 issued Jan. 25, 2000 to Wendt, et al., the disclosures of which are incorporated herein by reference for the limited purpose of showing a principal construction of the Jacquard weave. The present invention contemplates the molding member 200 comprising the filament-contacting side 201 having a Jacquard-weave pattern. Such a Jacquard-weave pattern may be utilized as a forming member 500, a molding member 200, a pressing surface, etc. A jacquard weave is reported in the literature to be particularly useful where one does not wish to compress or imprint a structure in a nip, such as typically occurs upon transfer to a Yankee drying drum.

In accordance with the present invention, one, several, or all of the apertures 220 of the molding member 200 may be "blind," or "closed," as described in U.S. Pat. No. 5,972,813, issued to Polat et al. on Oct. 26, 1999, the disclosure of which is incorporated herein by reference. As the patent cited immediately above describes, polyurethane foams, rubber, and silicone can be used to render the apertures 220 fluid-impermeable.

Figure 4A:
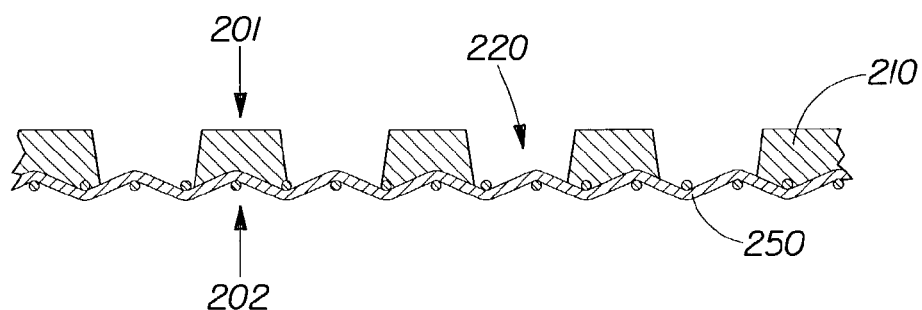
FIG. 4A is a schematic cross-sectional view taken along line 4A—4A of FIG. 4.
Figure 6:
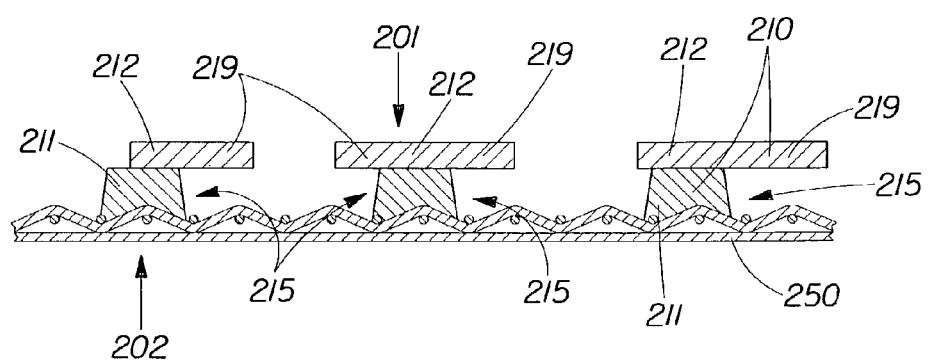
FIG. 6 is a schematic cross-sectional view of a still another embodiment of the molding member that can be used to form the flexible structure of the present invention.

An embodiment of the molding member 200 shown in FIG. 6 comprises a plurality of suspended portions 219 extending (typically laterally) from a plurality of base portions 211. The suspended portions 219 are elevated from the reinforcing element 250 to form void spaces 215 into which the starch filaments of the present invention can be deflected to form cantilever portions 129, as described above with reference to FIG. 3. The molding member 200 comprising suspended portions 219 may comprise a multi-layer structure formed by at least two layers (211, 212) joined together in a face-to-face relationship (FIG. 6). Each of the layers can comprise a structure similar to one of the several patents described above and incorporated herein by reference. Each of the layers (211, 212) can have at least one aperture (220, FIGS. 4, 4A) extending between the top surface and the bottom surface. The joined layers are positioned such that the at least one aperture of one layer is superimposed (in the direction perpendicular to the general plane of the molding member 200) with a portion of the framework of the other layer, which portion forms the suspended portion 219 described herein above.

Another embodiment of the molding member comprising a plurality of suspended portions can be made by a process of differential curing of a layer of a photosensitive resin, or other curable material, through a mask comprising transparent regions and opaque regions. The opaque regions comprise regions having differential opacity, for example, regions having a relatively high opacity (non-transparent, such as black) and regions having a relatively low, partial, opacity (i. e. having some transparency).

When the curable layer having a filament-receiving side and an opposite second side is exposed to curing radiation through the mask adjacent to the filament-receiving side of the coating, the non-transparent regions of the mask shield first areas of the coating from the curing radiation to preclude curing of the first areas of the coating through the entire thickness of the coating. The partial-opacity regions of the mask only partially shield second areas of the coating to allow the curing radiation to cure the second areas to a predetermined thickness less than the thickness of the coating (beginning from the filament-receiving side of the coating towards the second side thereof). The transparent regions of the mask leave third areas of the coating unshielded to allow the curing radiation to cure the third areas through the entire thickness of the coating.

Consequently, the uncured material can be removed from a partially-formed molding member. The resulting hardened framework has a filament-contacting side 201 formed from the filament-receiving side of the coating and a backside 202 formed from the second side of the coating. The resulting framework has a plurality of bases 211 comprising the backside 202 and formed from the third areas of the coating and a plurality of suspended portions 219 comprising the web-contacting side 201 and formed from the second areas of the coating. The plurality of bases may comprise a substantially continuous pattern, a substantially semi-continuous pattern, a discontinuous pattern, or any combination thereof, as discussed above. The suspended portions 219 extend, at an angle (typically, but not necessarily, at about 90°) from the plurality of bases and are spaced from the backside 202 of the resulting framework to form void spaces between the suspended portions and the backside 201. Typically, when the molding member 200 comprising a reinforcing element 250 is used, the void spaces 215 are formed between the suspended portions 219 and the reinforcing element 250, as best shown in FIG. 6.

The next step comprises depositing the plurality of pseudo-thermoplastic starch filaments on the filament contacting side 201 of the molding member 200, as schematically shown in FIGS. 7–9, and causing the plurality of starch filaments to at least partially conform to the three-dimensional pattern of the molding member 200. Referring to an embodiment schematically shown in FIG. 7, upon exiting the drawing unit, the starch filaments 17b are deposited on the three-dimensional filament contacting side 201 of a molding member 200. In an industrial continuous process, the molding member 200 comprises an endless belt continuously traveling in a machine direction MD, as schematically shown in FIGS. 7–9. The starch filaments can then be joined to one another and mutually entangled through a variety of conventional techniques. The disclosure of U.S. Pat. No. 5,688,468 issued to Lu on Nov. 18, 1997, teaching a process and apparatus fopr producing a spunbond, non-woven web composed of filaments of reduced diameter, is incorporated herein by reference.

In some embodiments, the plurality of starch filaments may first be deposited not to the molding member 10, but to a forming member 500, as schematically shown in FIG. 9. This step is optional and can be utilized to facilitate uniformity in the basis weight of the plurality of starch filaments throughout a width of the structure 10 being made. The forming member 500 comprising a wire is contemplated by the present invention. In an exemplary embodiment of FIG. 9, the forming member 500 travels in the machine direction about rolls 500a and 500b. The forming member is fluid permeable, and a vacuum apparatus 550 located under the forming member 500 and applying fluid pressure differential to the plurality of starch filaments disposed thereon encourages a more-or-less even distribution of the starch filaments throughout the receiving surface of the forming member 500.

Figure 11:
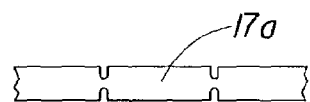
FIG. 11 is a schematic view of a fragment of a starch filament having a plurality of notches along at least a portion of the filament's length.

If desired, the forming member 200 can also be used to form various irregularities in the starch filaments, particularly on the surface of the filaments. For example, a filament-receiving surface of the forming member can comprise a variety of sharp edges (not shown) structured to imprint still relatively soft starch filaments deposited thereto, to create notches (schematically shown in FIG. 11) or other irregularities in the starch filaments, that can be beneficial to the flexible structure 100 being made, as described above.

In the embodiment of FIG. 9, the plurality of filaments can be transferred from the forming member 500 to the molding member 200 by any conventional means known in the art, for example, by a vacuum shoe 600 that applies a vacuum pressure which is sufficient to cause the plurality of starch filaments disposed on the forming member 500 to separate therefrom and adhere to the molding member 200.

It is contemplated that in the continuous process of making the flexible structure 100, the molding member 200 may have a linear velocity that is less that that of the forming member 500. The use of such a velocity differential at the transfer point is commonly known in the papermaking arts and can be used for so called "microcontraction" that is typically believed to be efficient when applied to low-consistency, wet webs. U.S. Pat. No. 4,440,597, the disclosure of which is incorporated herein by reference for the purpose of describing principal mechanism of microcontraction, describes in detail "wet-microcontraction." Briefly, wet-microcontraction involves transferring the web having a low fiber-consistency from a first member (such as a foraminous member) to a second member (such as a loop of open-weave fabric) moving slower than the first member. Now, it is believed that if the starch filaments can be formed and the plurality of starch filaments can be maintained in a sufficiently flexible condition by the time of transferal from a relatively slower moving support (such, for example, as the forming member 500) to a relatively faster moving support (such as, for example, the molding member 200), it may be possible to effectively subject the plurality of starch filaments to microcontraction, thereby foreshortening the flexible structure 100 being made. The velocity of the molding member 200 can be from about 1% to about 25% greater than that of the forming member 500.

Figure 9A:
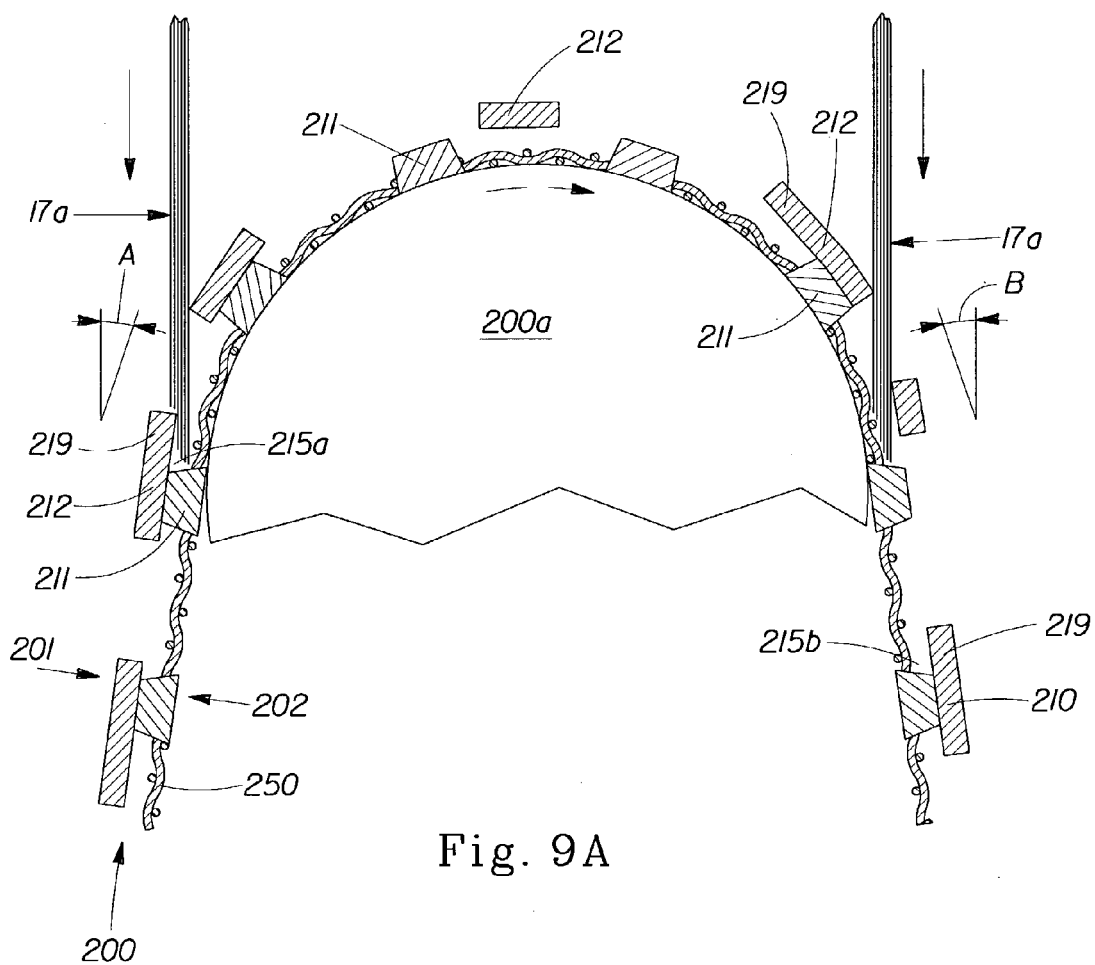
FIG. 9A is a schematic side-elevational and partial view of another embodiment of a process of the present invention.

FIG. 9A shows an embodiment of the process according to the present invention, wherein the starch filaments can be deposited to the molding member 200 at an angle A that can be from 1° to 89°, and more specifically, from about 5° to about 85°. This embodiment is believed to be especially beneficial when the molding member 200 having suspended portions 219 is used. Such an "angled" deposition of the starch filaments 17a to the molding member 200 makes the void spaces 215 formed between the suspended portions 219 and the reinforcing element 250 more accessible to long and flexible starch filaments 17a, and encourages the starch filaments to more easily fill the void spaces 215. In FIG. 9A, the starch filaments 17a are deposited to the molding member 200 in two steps, so that both kinds of the void spaces 219—upstream void spaces 215a and downstream void spaces 215b—can benefit from the angled deposition of the filaments to the molding member 200. Depending on a specific geometry of the molding member 200, particularly the geometry and/or orientation of its suspended portions 219, a downstream angle A may be equal or different from an upstream angle B.

As soon as the plurality of starch filaments is disposed on the filament contacting side 201 of the molding member 200, the plurality of filaments at least partially conforms to its three-dimensional pattern. In addition, various means can be utilized to cause or encourage the starch filaments to conform to the three-dimensional pattern of the molding member 200. One method comprises applying a fluid pressure differential to the plurality of starch filaments. This method can be especially beneficial when the molding member 200 is fluid-permeable. For example, a vacuum apparatus 550 disposed at the backside 202 of the fluid-permeable molding member 200 can be arranged to apply a vacuum pressure to the molding member 200 and thus to the plurality of starch filaments disposed thereon, FIG. 8. Under the influence of the vacuum pressure, some of the starch filaments can be deflected into the apertures 220 and/or the void spaces 215 of the molding member 200 and otherwise conform to the three-dimensional pattern thereof.

It is believed that all three regions of the flexible structure 100 may have generally equivalent basis weights. By deflecting a portion of starch filaments into the apertures 220, one can decrease the density of the resulting pillows 120 relative to the density of the first, imprinted, regions 110. The regions 110 that are not deflected in the apertures 220 may be imprinted by compressing flexible structure in a compression nip. If imprinted, the density of the imprinted regions 110 is increased relative to the density of the pillows 120 and the density of the third region 130. The densities of the regions 110 not deflected into the apertures 220 and the density of the third region 130 are higher than the density of the pillows 120. The third region 130 will likely have a density intermediate those of the imprinted regions 110 and the pillows 120.

Figure 1A:
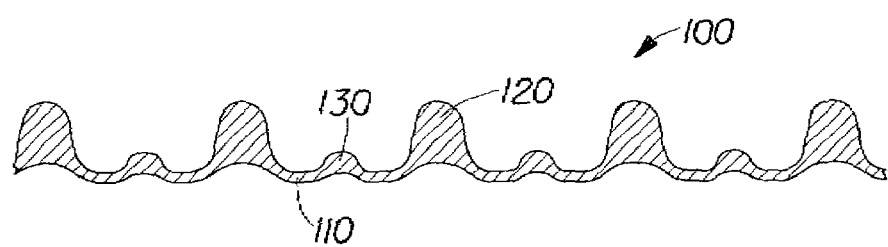
FIG. 1A is a schematic cross-sectional view taken along line 1A—1A of FIG. 1.

Referring still to FIG. 1A, the flexible structure 100 according to the present invention may be thought of as having three different densities. The highest density region will be the high density imprinted region 110. The imprinted region 110 corresponds in position and geometry to the framework 210 of the molding member 200. The lowest density region of the flexible structure 100 will be that of the pillows 120, corresponding in position and geometry to the apertures 220 of the molding member 200. The third region 130, corresponding to the synclines 230 in the molding member 200, will have a density intermediate those of the pillows 120 and the imprinted region 110. The "synclines" 230 are surfaces of the framework 210 having a Z-direction vector component extending from the filament-receiving side 201 of the molding member 200 towards the backside 202 thereof. The synclines 230 do not extend completely through the framework 210, as do the apertures 220. Thus, the difference between a syncline 230 and the apertures 220 may be thought of as the aperture 220 represents a through hole in the framework 210, whereas a syncline 230 represents a blind hole, fissure, chasm, or notch in the framework 210.

Figure 5A:
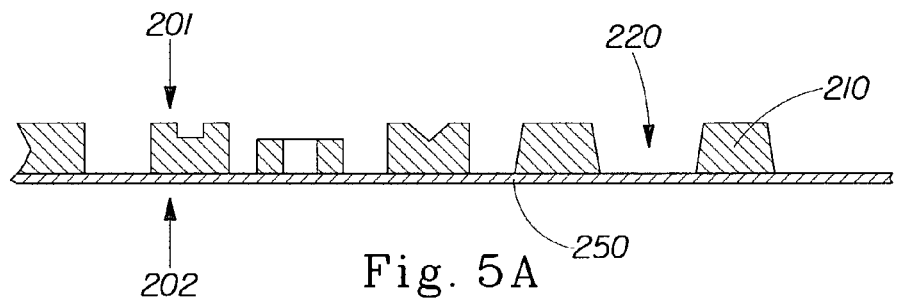
FIG. 5A is a schematic cross-sectional view taken along line 5A—5A of FIG. 5.

The three regions of the structure 100, according to the present invention, may be thought of as being disposed at three different elevations. As used herein, the elevation of a region refers to its distance from a reference plane (i. e., X-Y plane). For convenience, the reference plane can be visualized as horizontal, wherein the elevational distance from the reference plane is vertical. The elevation of a particular region(of the starch filament structure 100 may be measured using any non-contacting measurement device suitable for such purpose as is well known in the art. A particularly suitable measuring device is a non-contacting Laser Displacement Sensor having a beam size of 0.3×1.2 millimeters at a range of 50 millimeters. Suitable non-contacting Laser Displacement Sensors are sold by the Idec Company as models MX1A/B. Alternatively, a contacting stylis gauge, as is known in the art, may be utilized to measure the different elevations. Such a stylis gauge is described in U.S. Pat. No. 4,300,981 issued to Carstens, the disclosure of which is incorporated herein by reference. The structure 100 according to the present invention is placed on the reference plane with the imprinted region 110 in contact with the reference plane. The pillows 120 and the third region 130 extend vertically away from the reference plane. Differential elevations of the regions 110, 120, and 130 can also be formed by using the molding member 200 having differential depths or elevations of its three-dimensional pattern, as schematically shown in FIG. 5A. Such three-dimensional patterns having differential depths/elevations can be made by sanding preselected portions of the molding member 200 to reduce their elevation. Also, the molding member 200 comprising a curable material can be made by using a three-dimensional mask. By using a three-dimensional mask comprising differential depths/elevations of its depressions/protrusions, one can form a corresponding framework 210 also having differential elevations. Other conventional techniques of forming surfaces with differential elevation can be used for the foregoing purposes.

To ameliorate possible negative effect of a sudden application of a fluid pressure differential by a vacuum apparatus 550 (FIGS. 8 and 9) or a vacuum pick-up shoe 600 (FIG. 9), that could force some of the filaments or portions thereof all the way through the molding member 200 and thus lead to forming so-called pin-holes in the resultant flexible structure, the backside of the molding member can be "textured" to form microscopical surface irregularities. Those surface irregularities can be beneficial in some embodiments of the molding member 200, because they prevent formation of a vacuum seal between the backside 202 of the molding member 200 and a surface of the papermaking equipment (such as, for example, a surface of the vacuum apparatus), thereby creating a "leakage" therebetween and thus mitigating undesirable consequences of an application of a vacuum pressure in a through-air-drying process of making the flexible structure 100 of the present invention. Other methods of creating such a leakage are disclosed in U.S. Pat. Nos. 5,718,806; 5,741,402; 5,744,007; 5,776,311; and 5,885,421, the disclosures of which are incorporated herein by reference.

The leakage can also be created using so-called "differential light transmission techniques" as described in U.S. Pat. Nos. 5,624,790; 5,554,467; 5,529,664; 5,514,523; and 5,334,289, the disclosures of which are incorporated herein by reference. The molding member can be made by applying a coating of photosensitive resin to a reinforcing element that has opaque portions, and then exposing the coating to light of an activating wavelength through a mask having transparent and opaque regions, and also through the reinforcing element.

Another way of creating backside surface irregularities comprises the use of a textured forming surface, or a textured barrier film, as described in U.S. Pat. Nos. 5,364,504; 5,260,171; and 5,098,522, the disclosures of which are incorporated herein by reference. The molding member can be made by casting a photosensitive resin over and through the reinforcing element while the reinforcing element travels over a textured surface, and then exposing the coating to light of an activating wavelength through a mask which has transparent and opaque regions.

Such means as a vacuum apparatus 550 applying a vacuum (i. e., negative, less than atmospheric) pressure to the plurality of filaments through the fluid-permeable molding member 200, or a fan (not shown) applying a positive pressure to the plurality of filaments can be used to facilitate deflection of the plurality of filaments into the three-dimensional pattern of the molding member.

Furthermore, FIG. 9 schematically shows an optional step of the process of the present invention, wherein the plurality of starch filaments is overlaid with a flexible sheet of material 800 comprising an endless band traveling around rolls 800a and 800b and contacting the plurality of filaments. That is, the plurality of filaments is sandwiched, for a certain period of time, between the molding member 200 and the flexible sheet of material 800. The flexible sheet of material 800 can have air-permeability less than that of the molding member 200, and in some embodiments can be air-impermeable. An application of a fluid pressure differential P to the flexible sheet 800 causes deflection of at least a portion of the flexible sheet towards, and in some instances into, the three-dimensional pattern of the molding member 200, thereby forcing the plurality of starch filaments to closely conform to the three-dimensional pattern of the molding member 200. U.S. Pat. No. 5,893,965, the disclosure of which is incorporated herein by reference, describes a principle arrangement of an equipment and a process utilizing the flexible sheet of material.

Additionally or alternatively to the fluid pressure differential, mechanical pressure can also be used to facilitate formation of the three-dimensional microscopical pattern of the flexible structure 100 of the present invention. Such a mechanical pressure can be created by any suitable press surface, comprising, for example a surface of a roll or a surface of a band. FIG. 8 shows two exemplary embodiments of pressing surface. A pair or several pairs of press roll 900a and 900b, and 900c and 900d can be used to force the starch filaments disposed on the molding member 200 to more fully conform to the three-dimensional pattern thereof. The pressure exerted by the press rolls can be phased, if desired, for example, the pressure created between the rolls 900c and 900d can be greater than that between the rolls 900a and 900b. Alternatively or additionally, an endless press band 950 traveling about rolls 950a and 950b, can be pressed against a portion of the filament side 201 of the molding member 200, to impress the flexible structure 100 therebetween.

The press surface can be smooth or have a three-dimensional pattern of its own. In the latter instance, the press surface can be used as an embossing device, to form a distinctive micro-pattern of protrusions and/or depressions in the flexible structure 100, in cooperation with or independently from the three-dimensional pattern of the molding member 200. Furthermore, the press surface can be used to deposit a variety of additives, such for example, as softeners, and ink, to the flexible structure 200 being made. Conventional techniques, such as, for example, ink roll 910, or spraying device (or shower) 920 may be used to directly or indirectly deposit a variety of additives to the flexible structure 1200 being made.

The structure 100 may optionally be foreshortened, as is known in the art. Foreshortening can be accomplished by creping the structure 100 from a rigid surface, and more specifically from a cylinder, such as, for example, a cylinder 290 schematically shown in FIG. 9. Creping is accomplished with a doctor blade 292, as is well known in the art. Creping may be accomplished according to U.S. Pat. No. 4,919,756, issued Apr. 24, 1992 to Sawdai, the disclosure of which is incorporated herein by reference. Alternatively or additionally, foreshortening may be accomplished via microcontraction, as described above.

The flexible structure 100 that is foreshortened is typically more extensible in the machine direction than in the cross machine direction and is readily bendable about hinge lines formed by the foreshortening process, which hinge lines extend generally in the cross-machine direction, i. e., along the width of the flexible structure 100. The flexible structure 100 which is not creped and/or otherwise foreshortened, is contemplated to be within the scope of the present invention.

A variety of products can be made using the flexible structure 100 of the present invention. The resultant products may find use in filters for air, oil and water; vacuum cleaner filters; furnace filters; face masks; coffee filters, tea or coffee bags; thermal insulation materials and sound insulation materials; nonwovens for one-time use sanitary products such as diapers, feminine pads, and incontinence articles; biodegradable textile fabrics for improved moisture absorption and softness of wear such as microfiber or breathable fabrics; an electrostatically charged, structured web for collecting and removing dust; reinforcements and webs for hard grades of paper, such as wrapping paper, writing paper, newsprint, corrugated paper board, and webs for tissue grades of paper such as toilet paper, paper towel, napkins and facial tissue; medical uses such as surgical drapes, wound dressing, bandages, dermal patches and self-dissolving sutures; and dental uses such as dental floss and toothbrush bristles. The flexible structure may also include odor absorbants, termite repellents, insecticides, rodenticides, and the like, for specific uses. The resultant product absorbs water and oil and may find use in oil or water spill clean-up, or controlled water retention and release for agricultural or horticultural applications. The resultant starch filaments or fiber webs may also be incorporated into other materials such as saw dust, wood pulp, plastics, and concrete, to form composite materials, which can be used as building materials such as walls, support beams, pressed boards, dry walls and backings, and ceiling tiles; other medical uses such as casts, splints, and tongue depressors; and in fireplace logs for decorative and/or burning purpose.

TEST METHODS

A. Shear Viscosity

The shear viscosity of the composition is measured using a capillary rheometer (Model Rheograph 2003, manufactured by Goettfert). The measurements are conducted using a capillary die having a diameter D of 1.0 mm and a length L of 30 mm (i.e., L/D=30). The die is attached to the lower end of a barrel, which is held at a test temperature (t) ranging from 25° C. to 90° C. A sample composition which has been preheated to the test temperature is loaded into the barrel section of the rheometer, and substantially fills the barrel section (about 60 grams of sample is used). The barrel is held at the specified test temperature (t). If after the loading, air bubbles to the surface, compaction prior to running the test is used to rid the sample of entrapped air. A piston is programmed to push the sample from the barrel through the capillary die at a set of chosen rates. As the sample goes from the barrel through the capillary die, the sample experiences a pressure drop. An apparent shear viscosity is calculated from the pressure drop and the flow rate of the sample through the capillary die. Then log (apparent shear viscosity) is plotted against log (shear rate) and the plot is fitted by the power law $\eta = K \gamma^{n-1}$, wherein K is a material constant, $\gamma$ is the shear rate. The reported shear viscosity of the composition herein is an extrapolation to a shear rate of 3000 s$^{-1}$ using the power law relation.

B. Extensional Viscosity

The extensional viscosity is measured using a capillary rheometer (Model Rheograph 2003, manufactured by Goettfert). The measurements are conducted using a semi-hyperbolic die design with an initial diameter ($D_{initial}$) of 15 mm, a final diameter ($D_{final}$) of 0.75 mm and a length (L) of 7.5 mm.

The semi-hyperbolic shape of the die is defined by two equations. Where Z=the axial distance from the initial diameter, and where D(z) is the diameter of the die at distance z from $D_{initial}$;

$$Z_n = (L+1)^{\frac{(n-1)}{n_{total}}} - 1$$

$$D(Z_n) = \sqrt{\frac{(D_{initial}2)}{\left[1 + \frac{Z_n}{L} \cdot \left[\left(\frac{D_{initial}}{D_{final}}\right)^2 - 1\right]\right]}}$$

The die is attached to the lower end of a barrel, which is held at a fixed test temperature (t) which corresponds to the temperature at which the starch composition is to be processed. The test temperature (processing temperature) is a temperature above the melting point of a sample starch composition. The sample starch composition is preheated to the die temperature is loaded into the barrel section of the rheometer, and substantially fills the barrel section. If after the loading, air bubbles to the surface, compaction prior to running the test is used to rid the molten sample of entrapped air. A piston is programmed to push the sample from the barrel through the hyperbolic die at a chosen rate. As the sample goes from the barrel through the orifice die, the sample experiences a pressure drop. An apparent extensional viscosity is calculated from the pressure drop and the flow rate of the sample through the die according to the following equation:

Extensional Viscosity=(delta P/extension rate/$E_h$)·10$^{+5}$), where Extensional Viscosity is in Pascal-Seconds, delta P is the pressure drop in bars, extension rate is the flow rate of the sample through the die in sec$^{-1}$, and $E_h$ is dimensionless Hencky strain. Hencky strain is the time or history dependent strain. The strain experienced by a fluid element in a non-Newtonian fluid is dependent on its kinematic history, that is $$\varepsilon = \int_0^t \dot{\varepsilon} \cdot (t') \partial t'$$

The Hencky Strain ($E_h$) for this design is 5.99 defined by the equation:

$$Eh = \ln[(D_{initial}/D_{final})^2]$$

The apparent extensional viscosity is reported as a function of extension rate of 250$^{-1}$ using the power law relation. Detailed disclosure of extensional viscosity measurements using a semi-hyperbolic die is found in U.S. Pat. No. 5,357,784, issued Oct. 25, 1994 to Collier, the disclosure of which is incorporated herein by reference.

C. Molecular Weight and Molecular Weight Distribution

The weight-average molecular weight (Mw) and molecular weight distribution (MWD) of starch are determined by Gel Permeation Chromatography (GPC) using a mixed bed column. Parts of the instrument are as follows:

| | |
|---|---|
| Pump: | Waters Model 600E |
| System controller: | Waters Model 600E |
| Autosampler: | Waters Model 717 Plus |
| Column: | PL gel 20 µm Mixed A column (gel molecular weight ranges from 1,000 to 40,000,000) having a length of 600 mm and an internal diameter of 7.5 mm. |
| Detector: | Waters Model 410 Differential Refractometer GPC software Waters Millennium ® software |

The column is calibrated with Dextran standards having molecular weights of 245,000; 350,000; 480,000; 805,000; and 2,285,000. These Dextran calibration standards are available from American Polymer Standards Corp., Mentor, Ohio. The calibration standards are prepared by dissolving the standards in the mobile phase to make a solution of about 2 mg/ml. The solution sits undisturbed overnight. Then it is gently swirled and filtered through a syringe filter (5 µm Nylon membrane, Spartan-25, available from VWR) using a syringe (5 ml, Norm-Ject, available from VWR).

The starch sample is prepared by first making a mixture of 40 wt % starch in tap water, with heat applied until the mixture gelatinizes. Then 1.55 grams of the gelatinized mixture is added to 22 grams of mobile phase to make a 3 mg/ml solution which is prepared by stirring for 5 minutes, placing the mixture in an oven at 105° C. for one hour, removing the mixture from the oven, and cooling to room temperature. The solution is filtered using the syringe and syringe filter as described above.

The filtered standard or sample solution is taken up by the autosampler to flush out previous test materials in a 100 µl injection loop and inject the present test material into the column. The column is held at 70° C. The sample eluded from the column is measured against the mobile phase background by a differential refractive index detector held at 50° C. and with the sensitivity range set at 64. The mobile phase is DMSO with 0.1% w/v LiBr dissolved therein. The flow rate is set at 1.0 ml/min and in the isocratic mode (i.e., the mobile phase is constant during the run). Each standard or sample is run through the GPC three times and the results are averaged.

The molecular weight distribution (MWD) is calculated as follows:

MWD=weight average molecular weight/number average molecular weight

D. Thermal Properties

Thermal properties of the present starch compositions are determined using a TA Instruments DSC-2910 which has been calibrated with an indium metal standard, which has an melting temperature (onset) of 156.6° C. and a heat of melting of 6.80 calories per gram, as reported in the chemical literature. Standard DSC operating procedure per manufacturer's Operating Manual is used. Due to the volatile evolution (e.g., water vapor) from the starch composition during a DSC measurement, a high volume pan equipped with an o-ring seal is used to prevent the escape of volatiles from the sample pan. The sample and an inert reference (typically an empty pan) are heated at the same rate in a controlled environment. When an actual or pseudo phase change occurs in the sample, the DSC instrument measures the heat flow to or from the sample versus that of the inert reference. The instrument is interfaced with a computer for controlling the test parameters (e.g., the heating/cooling rate), and for collecting, calculating and reporting the data.

The sample is weighed into a pan and enclosed with an o-ring and a cap. A typical sample size is 25–65 milligrams. The enclosed pan is placed in the instrument and the computer is programmed for the thermal measurement as follows:

1. equilibrate at 0° C.;
2. hold for 2 minutes at 0° C.;
3. heat at 10° C./min to 120° C.;
4. hold for 2 minutes at 120° C.;
5. cool at 10° C./min to 30° C.;
6. equilibrate at ambient temperature for 24 hours, the sample pan may be removed from the DSC instrument and placed in a controlled environment at 30° C. in this duration;
7. return sample pan to the DSC instrument and equilibrate at 0° C.;
8. hold for 2 minutes;
9. heat at 10° C./min to 120° C.;
10. hold for 2 minutes at 120° C.;
11. cool at 10° C./min to 30° C. and equilibrate; and
12. remove the used sample.

The computer calculates and reports the thermal analysis result as differential heat flow ($\Delta H$) versus temperature or time. Typically the differential heat flow is normalized and reported on per weight basis (i.e, cal/mg). Where the sample exhibits a pseudo phase transition, such as a glass transition, a differential of the $\Delta H$ v. time/temperature plot may be employed to more easily determine a glass transition temperature.

E. Water Solubility

A sample composition is made by mixing the components with heat and stirring until a substantially homogeneous mixture is formed. The melt composition is cast into a thin film by spreading it over a Teflon® sheet and cooling at ambient temperature. The film is then dried completely (i.e., no water in the film/composition) in an oven at 100° C. The dried film is then equilibrated to room temperature. The equilibrated film is ground into small pellets.

To determine the % solids in the sample, 2 to 4 grams of the ground sample is placed in a pre-weighed metal pan and the total weight of pan and sample is recorded. The weighed pan and sample is placed in a 100° C. oven for 2 hours., and then taken out and weighed immediately. The % solids is calculated as follows:

$$\% \text{ Solids} = \frac{(\text{dried weight of ground sample \& pan} - \text{weight of pan})}{(\text{first weight of ground sample \& pan} - \text{weight of pan})} \cdot 100$$

To determine the solubility of the sample composition, weigh 10 grams of ground sample in a 250 mL beaker. Add deionized water to make a total weight of 100 grams. Mix the sample and water on a stir plate for 5 minutes. After stirring, pour at least 2 mL of stirred sample into a centrifuge tube. Centrifuge 1 hour at 20,000 g at 10° C. Take the supernatant of the centrifuged sample and read the refractive index. The % solubility of the sample is calculated as follows:.

$$\% \text{ Soluble Solids} = \frac{(\text{Refractive Index}\#) \cdot 1000}{\% \text{ Solids}}$$

F. Caliper

Prior to testing, the film sample is conditioned at a relative humidity of 48%–50% and at a temperature of 22° C. to 24° C. until a moisture content of about 5% to about 16% is achieved. The moisture content is determined by TGA (Thermo Gravimetric Analysis). For Thermal Gravimetric Analysis, a high resolution TGA2950 Termogravimetric analyzer from TA Instruments is used. Approximately 20 mg of sample is weighed into a TGA pan. Following the manufacturer's instructions, the sample and pan are inserted into the unit and the temperature is increased at a rate of 10° C./minute to 250° C. The % moisture in the sample is determined using the weight lost and the initial weight as follows:

$$\% \text{ Moisture} = \frac{\text{Start Weight} - \text{Weight@ 250}^\circ \text{ C}}{\text{Start Weight}} * 100\%$$

Preconditioned samples are cut to a size greater than the size of the foot used to measure the caliper. The foot to be used is a circle with an area of 3.14 square inches.

The sample is placed on a horizontal flat surface and confined between the flat surface and a load foot having a horizontal loading surface, where the load foot loading surface has a circular surface area of about 3.14 square inches and applies a confining pressure of about 15 g/square cm (0.21 psi) to the sample. The caliper is the resulting gap between the flat surface and the load foot loading surface. Such measurements can be obtained on a VIR Electronic Thickness Tester Model II available from Thwing-Albert, Philadelphia, Pa. The caliper measurement is repeated and recorded at least five times. The result is reported in mils.

The sum of the readings recorded from the caliper tests is divided by the number of readings recorded. The result is reported in mils.

What is claimed is:

1. A process for making continuous starch filaments, the process comprising steps of:
    (a) providing a starch composition comprising having an extensional viscosity from about 50 Pascal·second to about 20,000 pascal·second; and
    (b) electro-spinning the starch composition, thereby producing the starch filaments having a size from about 0.001 dtex to about 135 dtex.

2. The process according to claim 1, wherein the step of providing a starch composition comprises providing a starch composition wherein the starch has a weight-average molecular weight from about 1,000 to about 2,000,000.

3. The process according to claim 1, wherein in the step of electro-spinning, the starch composition has an inherent capillary number of at least 0.05.

4. The process according to claim 2, wherein the starch composition has an inherent capillary number of at least 1.

5. The process according to claim 1, wherein the step of providing a starch composition comprises providing a starch composition wherein from about 20% to about 99% by weight is amylopectin.

6. The process according to claim 5, wherein the starch composition comprises from about 10% to about 80% by weight of the starch and from about 20% to about 90% by weight of additives, and wherein the starch composition has the extensional viscosity from about 100 pascal·seconds to about 15,000 pascal·seconds.

7. The process according to claim 5, wherein the starch composition comprises from about 20% to about 70% by weight of the starch and from about 30% to about 80% by weight of additives, and wherein the starch composition has the extensional viscosity from about 200 pascal·seconds to about 10,000 pascal·seconds.

8. The process according to claim 5, wherein the starch composition has the extensional viscosity from about 200 pascal·seconds to about 10,000 pascal·seconds and an inherent capillary number from about 3 to about 50.

9. The process according to claim 8, wherein the starch composition has the extensional viscosity from about 300 pascal·seconds to about 5,000 pascal·seconds and a capillary number from about 5 to about 30.

10. The process according to claim 1, wherein the step of providing a starch composition comprises providing a starch composition comprising from about 0.0005% to about 5% by weight of a high polymer having an average molecular weight of at least 500,000, the high polymer being substantially compatible with the starch.

11. The process according to claim 1, wherein the step of providing a starch composition comprises providing the starch composition comprising an additive selected from the group consisting of plasticizers and diluents.

12. The process according to claim 11, wherein the starch composition further comprises from about 5% to about 95% by weight of a protein, the protein comprising a corn-derived protein, a soybean-derived protein, a wheat derived protein, or any combination thereof.

13. The process according to claim 1, further comprising a step of attenuating the starch filaments with streams of air.

14. A process for making a flexible structure comprising starch filaments, the process comprising steps of:
    (a) providing a starch composition having an extensional viscosity from about 100 pascal·second to about 10,000 pascal·second;
    (b) providing a molding member having a three-dimensional filament-receiving side and a backside opposite thereto, the filament-receiving side comprising a substantially continuous pattern, a substantially semi-continuous pattern, a discrete pattern, or any combination thereof;
    (c) electro-spinning the starch composition, thereby producing a plurality of starch filaments; and
    (d) depositing the plurality of starch filaments on the filament-receiving side of the molding member, wherein the starch filaments conform to the three-dimensional pattern of the filament-receiving side.

15. The process according to claim 14, wherein the step of providing a starch composition comprises providing a starch composition wherein the starch has a weight-average molecular weight from about 1,000 to about 2,000,000 and wherein the starch composition comprises a high polymer having a weight-average molecular weight of at least 500,000.

16. The process according to claim 14, wherein the step of electro-spinning the starch composition comprises electro-spinning the starch composition through a die.

17. The process according to claim 16, further comprising a step of attenuating the starch filaments with air.

18. The process according to claim 14, wherein the step of providing a molding member comprises providing a molding member structured to continuously travel in a machine direction.

19. The process according to claim 14, wherein the step of providing a molding member comprises providing a molding member formed by a reinforcing element disposed at a first elevation, and a resinous framework joined to the reinforcing element in a face-to-face relationship and outwardly extending from the reinforcing element to form a second elevation.

20. The process according to claim 19, wherein the molding member is fluid-permeable and comprises a plurality of interwoven yarns, a felt, or any combination thereof.

21. The process according to claim 20, wherein the resinous framework comprises a plurality of bases outwardly extending from the reinforcing element and a plurality of cantilever portions laterally extending from the bases at the second elevation to form void spaces between the cantilever portions and the reinforcing element, wherein the plurality of bases and the plurality of cantilever portions form, in combination, the three-dimensional filament-receiving side of the molding member.

22. The process according to claim 14, wherein the step of depositing the plurality of starch filaments to the filament-receiving side of the molding member comprises applying a fluid pressure differential to the plurality of starch filaments.

23. The process according to claim 2, wherein the step of providing a starch composition comprises providing a starch composition comprising a high polymer.

* * * * *

UNITED STATES PATENT AND TRADEMARK OFFICE
CERTIFICATE OF CORRECTION

PATENT NO.       : 7,029,620 B2
APPLICATION NO.  : 10/387690
DATED            : April 18, 2006
INVENTOR(S)      : Gregory Charles Gordon et al.

It is certified that error appears in the above-identified patent and that said Letters Patent is hereby corrected as shown below:

In Col. 14, line 39, the words "o-starch" should be --α-starch--.
In Col. 16, line 32, the word "Theological" should be --rheological--.
In Col. 19, line 21, the words "and a is the surface" should be --and σ is the surface--.
In Col. 19, line 32, the words "electric to field" should be --electric field--.
In Col. 28, line 54, the words "region (of" should be --region of--.
In Col. 32, lines 36-37, the equation "Extensional Viscosity=(delta P/extension rate/$E_h$)) • $10^+{}_5$)," should be --Extensional Viscosity = (delta P/extension rate/$E_h$) • $10^{+5}$),--.
In Col. 32, lines 48-49, the equation $$\varepsilon = \int_0^t \varepsilon^\bullet(t') \partial t'$$

should be -- $\varepsilon = \int_0^t \varepsilon^\bullet(t') \partial t'$ --

Signed and Sealed this

Twenty-sixth Day of December, 2006

JON W. DUDAS
*Director of the United States Patent and Trademark Office*